US012791759B2

(12) United States Patent
Khoshnegar Shahrestani et al.

(10) Patent No.: US 12,791,759 B2
(45) Date of Patent: Nov. 10, 2026

(54) FOCUSING METASURFACE-BASED REFLECTOR FOR IMAGE RENDERING

(71) Applicant: Authentix, Inc., Addison, TX (US)

(72) Inventors: Milad Khoshnegar Shahrestani, Coquitlam (CA); Po-Han Chang, Coquitlam (CA)

(73) Assignee: Authentix, Inc., Addison, TX (US)

( * ) Notice: Subject to any disclaimer, the term of this patent is extended or adjusted under 35 U.S.C. 154(b) by 263 days.

(21) Appl. No.: 18/635,273

(22) Filed: Apr. 15, 2024

(65) Prior Publication Data

US 2025/0321356 A1 Oct. 16, 2025

(51) Int. Cl.

| | |
|---|---|
| ***G02B 5/02*** | (2006.01) |
| ***B42D 25/328*** | (2014.01) |
| ***B42D 25/373*** | (2014.01) |
| ***G02B 1/00*** | (2006.01) |
| ***G02B 5/18*** | (2006.01) |
| *B42D 25/29* | (2014.01) |

(52) U.S. Cl.
CPC ........... *G02B 1/002* (2013.01); *B42D 25/328* (2014.10); *B42D 25/373* (2014.10); *G02B 5/1876* (2013.01); *B42D 25/29* (2014.10)

(58) Field of Classification Search
CPC .... B42D 25/373; B42D 25/29; B42D 25/324; B42D 25/328; G02B 1/002; G02B 5/1876
See application file for complete search history.

(56) References Cited

U.S. PATENT DOCUMENTS

| | | | | |
|---|---|---|---|---|
| 9,070,237 | B2 | 6/2015 | Holmes | G07D 7/006 |
| 2011/0027499 | A1 | 2/2011 | Wolf et al. | 427/555 |
| 2019/0121004 | A1* | 4/2019 | Ahmed | G02B 5/021 |
| 2019/0137665 | A1* | 5/2019 | You | G01B 11/25 |
| 2019/0292047 | A1 | 9/2019 | Keshavaraz et al. | B81C 99/0085 |
| 2020/0341174 | A1 | 10/2020 | Keshavaraz et al. | G02B 5/0231 |
| 2020/0343416 | A1* | 10/2020 | Tamma | H10H 20/841 |
| 2021/0070091 | A1 | 3/2021 | Holmes | B42D 25/29 |
| 2022/0020963 | A1* | 1/2022 | Lee | H10K 59/878 |

(Continued)

OTHER PUBLICATIONS

U.S. Appl. No. 18/600,514, filed Mar. 8, 2024, Dey et al.

(Continued)

*Primary Examiner* — Audrey Y Chang
(74) *Attorney, Agent, or Firm* — Conley Rose, P.C.; Rodney B. Carroll

(57) ABSTRACT

An ultrathin reflective metalens, that is particularly suitable for being manufactured by roll-to-roll nanoimprint lithography processes, comprises a plurality of low aspect ratio (height/width <2) plasmonic meta-atoms. The meta-atoms have a maximum dimension of 500 nanometers. The meta-atoms are arranged to form a multi-zone Fresnel-type lens having a short focal length of less than one hundred microns. In one example, in addition to the metalens, a reflective pixel object is disposed above the metalens so that the principal axis of the metalens passes through the reflective pixel object. The reflective pixel object in one example has a plurality of different color-shifting portions so that a viewer, when looking at the overall structure, perceives different images depending on viewing angle. The metalens and associated reflective pixel object see particular use as a security feature, such for example on a security document such as a banknote.

15 Claims, 19 Drawing Sheets

(56) References Cited

U.S. PATENT DOCUMENTS

| | | | | |
|---|---|---|---|---|
| 2022/0237979 | A1 | 7/2022 | Rich et al. | G07D 7/128 |
| 2022/0314682 | A1 | 10/2022 | Tamulevicius et al. | B42D 25/328 |
| 2023/0036961 | A1 | 2/2023 | Pala et al. | H05B 6/766 |
| 2023/0194757 | A1 | 6/2023 | Hansen et al. | G02B 1/002 |
| 2023/0202223 | A1 | 6/2023 | Holmes | B42D 25/29 |
| 2023/0347679 | A1 | 11/2023 | Godfrey et al. | B42D 25/324 |
| 2023/0350112 | A1 | 11/2023 | Bilenberg et al. | G02B 5/1857 |
| 2023/0364935 | A1 | 11/2023 | Godfrey et al. | B42D 25/324 |

OTHER PUBLICATIONS

WO2023/174664, Khoshnegar Shahrestani et al., WIPO, 61 pages (published Sep. 21, 2023).

E. Plum, “Metamaterials, Metalenses and Beyond,” Ingenia, The Royal Academy of Engineering, Issue 91 16 pages (Jun. 2022).

H. Yang, et al., “Reflective metalens with sub-diffraction-limited and multifunctional focusing” Scientific Reports, 10 pages (2017).

W. Si, et al., “Robust Achromatic All-Dielectric Metalens for Infrared Detection in Intelligent Inspection”, Sensors, Issue 22, 9 pages (Aug. 2022).

J. Kim et al., “World’s First Mass Production Of Metalenses For Visible Wavelengths”, Pohang University of Science & Technology (POSTECH), 4 pages (May 9, 2023).

S. Moon et al., “Recent Progress on Ultrathin Metalenses for Flat Optics,” iScience, Issue 23, 21 pages (Dec. 18, 2020).

S. Moreno-Rodriguez et al., “Polarization-Insensitive Unit Cells For A Cost-Effective Design Of A 3-D-Printed Fresnel-Lens Antenna”, Electronics, 11,338, 11 pages (2022).

D. Jeon et al., “Recent Advancements Of Metalenses For Functional Imaging”, Nano Convergence, 10:24, 26 pages, (May 24, 2023).

N. Meinzer et al., “Plasmonic Meta-atoms and Metasurfaces”, Nature Photonics, Issue 8(12), pp. 889-898 (Nov. 27, 2014).

* cited by examiner

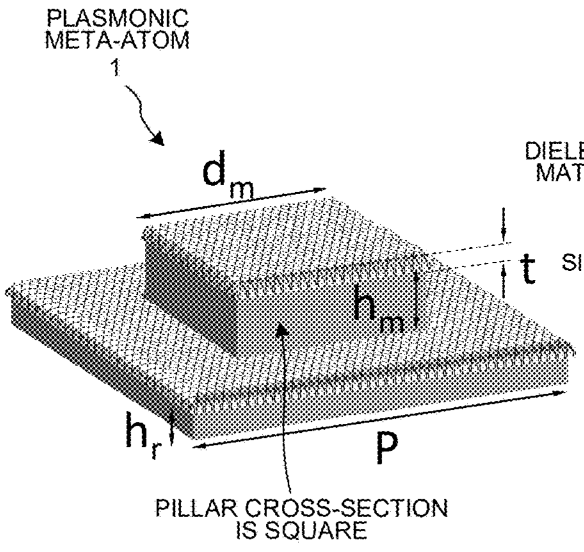
FIG. 1
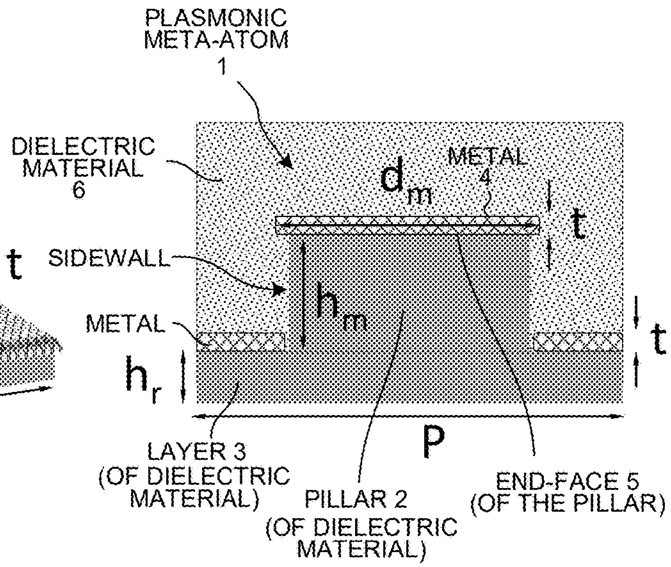
FIG. 2
META-ATOM DIMENSIONS (RANGE):
| | P | $h_m$ | $d_m$ | t |
|---|---|---|---|---|
| Range (nm) | 150-500 | 50-500 | 150-500 | 10-60 |
META-ATOM DIMENSIONS (PREFERRED RANGE):
| | P | $h_m$ | $d_m$ | t |
|---|---|---|---|---|
| Range (nm) | 200-350 | 50-180 | 200-350 | 20-40 |
FIG. 3
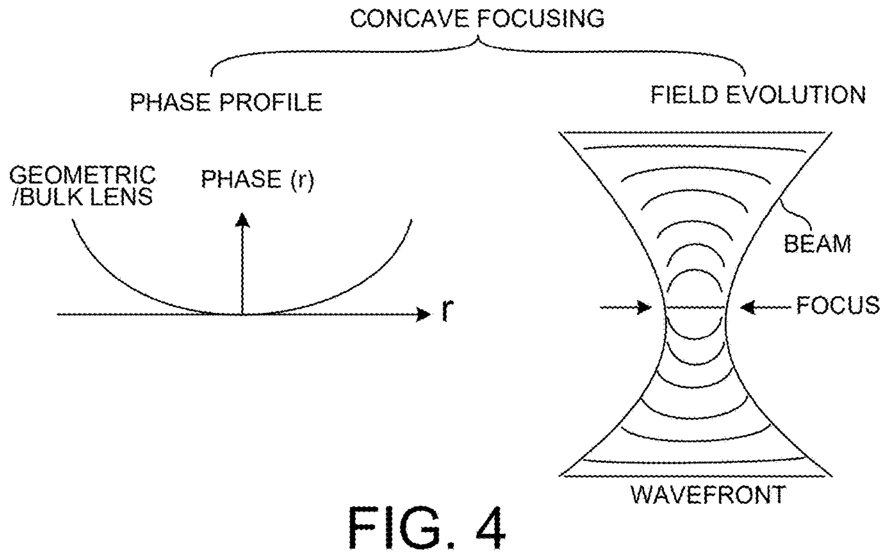
FIG. 4

| | DIAMETER (μm) | FOCUSING EFFICIENCY | TRANSPARENT EFFICIENCY | TOTAL EFFICIENCY | FWHM |
|---|---|---|---|---|---|
| FIG. 13 (NA=0.2) | 20 | 68% | 22% | 15% | 1400nm |
| FIG. 14 (NA=0.6) | 20 | 80% | 17% | 14% | 530 nm |
| FIG. 15 (NA=0.2) | 30 | 76% | 26% | 20% | 1200nm |
| FIG. 16 (NA=0.6) | 40 | 78% | 32% | 25% | 520 nm |

| | DIAMETER (μm) | FOCUSING EFFICIENCY | TRANSPARENT EFFICIENCY | TOTAL EFFICIENCY | FWHM |
|---|---|---|---|---|---|
| FIG. 13 (NA=0.2) | 20 | 80% | 23% | 18% | 1280 nm |
| FIG. 14 (NA=0.6) | 20 | 71% | 18% | 13% | 425 nm |
| FIG. 15 (NA=0.2) | 30 | 74% | 18% | 14% | 1280 nm |
| FIG. 16 (NA=0.6) | 40 | 66% | 19% | 13% | 505 nm |

FIG. 19N
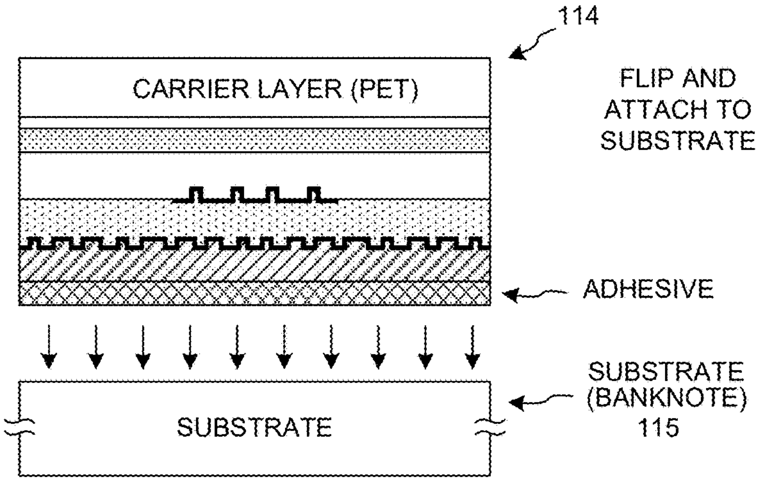
FIG. 19O
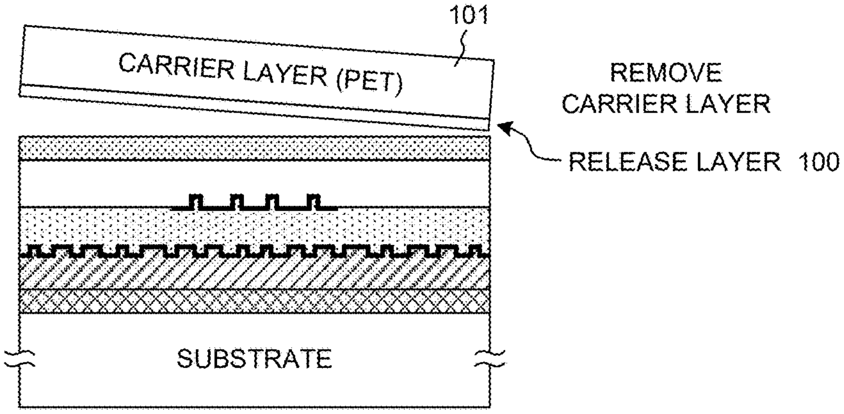
FIG. 19P
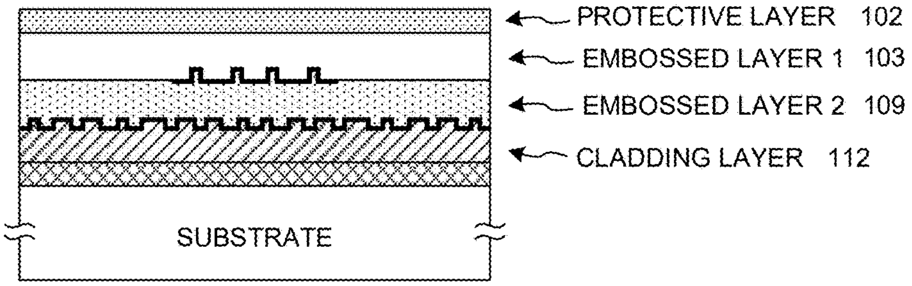
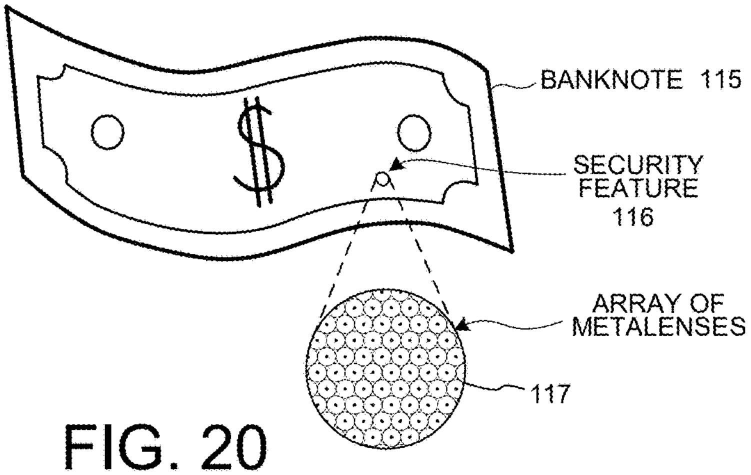
FIG. 20

METALENS

LENS DIAMETER = 20µm
FOCAL LENGTH = 15µm
ULTRA-THIN = LESS THAN 500nm
ALL META-ATOM PILLARS ARE OF THE SAME HEIGHT

| | 0.3 | 0.6 | 0.9 | 1.2 | 1.5 | 1.8 | 2.1 | 2.4 | 2.7 | 3 | 3.3 | 3.6 | 3.9 | 4.2 | 4.5 | 4.8 |
|---|---|---|---|---|---|---|---|---|---|---|---|---|---|---|---|---|
| 9.9 | 208 | 208 | 208 | 208 | 0 | 0 | 0 | 0 | 0 | 0 | 0 | 0 | 0 | 0 | 0 | 0 |
| 9.6 | 144 | 144 | 144 | 176 | 176 | 176 | 176 | 208 | 208 | 0 | 0 | 0 | 0 | 0 | 0 | 0 |
| 9.3 | 64 | 64 | 64 | 64 | 112 | 112 | 144 | 144 | 176 | 176 | 208 | 208 | 0 | 0 | 0 | 0 |
| 9 | 208 | 208 | 208 | 208 | 208 | 224 | 224 | 64 | 64 | 112 | 144 | 176 | 176 | 208 | 0 | 0 |
| 8.7 | 176 | 176 | 176 | 176 | 176 | 208 | 208 | 208 | 208 | 224 | 64 | 112 | 144 | 144 | 176 | 208 |
| 8.4 | 112 | 112 | 112 | 144 | 144 | 144 | 176 | 176 | 176 | 208 | 208 | 224 | 224 | 64 | 144 | 176 |
| 8.1 | 224 | 224 | 224 | 224 | 224 | 64 | 64 | 112 | 144 | 144 | 176 | 176 | 208 | 208 | 224 | 112 |
| 7.8 | 208 | 208 | 208 | 208 | 208 | 208 | 224 | 224 | 64 | 64 | 112 | 144 | 176 | 176 | 208 | 224 |
| 7.5 | 144 | 144 | 176 | 176 | 176 | 176 | 208 | 208 | 208 | 224 | 224 | 64 | 112 | 144 | 176 | 208 |
| 7.2 | 64 | 64 | 112 | 112 | 144 | 144 | 144 | 176 | 176 | 208 | 208 | 208 | 224 | 64 | 144 | 144 |
| 6.9 | 224 | 224 | 224 | 224 | 224 | 64 | 64 | 112 | 144 | 144 | 176 | 208 | 208 | 224 | 224 | 112 |
| 6.6 | 208 | 208 | 208 | 208 | 208 | 208 | 224 | 224 | 64 | 112 | 144 | 144 | 176 | 208 | 208 | 224 |
| 6.3 | 176 | 176 | 176 | 176 | 176 | 208 | 208 | 208 | 208 | 224 | 64 | 112 | 144 | 176 | 176 | 208 |
| 6 | 112 | 112 | 144 | 144 | 144 | 144 | 176 | 176 | 208 | 208 | 208 | 224 | 64 | 112 | 144 | 176 |
| 5.7 | 224 | 224 | 64 | 64 | 64 | 112 | 144 | 144 | 176 | 176 | 208 | 208 | 224 | 224 | 112 | 144 |
| 5.4 | 208 | 208 | 224 | 224 | 224 | 224 | 64 | 112 | 112 | 144 | 176 | 176 | 208 | 208 | 224 | 64 |
| 5.1 | 208 | 208 | 208 | 208 | 208 | 208 | 224 | 224 | 64 | 112 | 144 | 144 | 176 | 208 | 208 | 224 |
| 4.8 | 176 | 176 | 176 | 176 | 176 | 208 | 208 | 208 | 224 | 224 | 64 | 112 | 144 | 176 | 208 | 208 |
| 4.5 | 144 | 144 | 144 | 144 | 176 | 176 | 176 | 208 | 208 | 208 | 224 | 64 | 112 | 144 | 176 | 208 |
| 4.2 | 64 | 64 | 112 | 112 | 144 | 144 | 144 | 176 | 176 | 208 | 208 | 224 | 224 | 112 | 144 | 176 |
| 3.9 | 224 | 224 | 224 | 64 | 64 | 112 | 112 | 144 | 176 | 176 | 208 | 208 | 224 | 224 | 112 | 144 |
| 3.6 | 208 | 224 | 224 | 224 | 224 | 64 | 64 | 112 | 144 | 144 | 176 | 208 | 208 | 224 | 64 | 112 |
| 3.3 | 208 | 208 | 208 | 208 | 208 | 224 | 224 | 64 | 112 | 144 | 144 | 176 | 208 | 208 | 224 | 64 |
| 3 | 176 | 208 | 208 | 208 | 208 | 208 | 224 | 224 | 64 | 64 | 144 | 144 | 176 | 208 | 208 | 224 |
| 2.7 | 176 | 176 | 176 | 176 | 208 | 208 | 208 | 208 | 224 | 64 | 112 | 144 | 176 | 176 | 208 | 224 |
| 2.4 | 144 | 176 | 176 | 176 | 176 | 176 | 208 | 208 | 208 | 224 | 64 | 112 | 144 | 176 | 208 | 208 |
| 2.1 | 144 | 144 | 144 | 144 | 176 | 176 | 176 | 208 | 208 | 224 | 224 | 64 | 112 | 144 | 176 | 208 |
| 1.8 | 112 | 144 | 144 | 144 | 144 | 176 | 176 | 176 | 208 | 208 | 224 | 64 | 112 | 144 | 176 | 208 |
| 1.5 | 112 | 112 | 112 | 144 | 144 | 144 | 176 | 176 | 208 | 208 | 208 | 224 | 64 | 144 | 176 | 176 |
| 1.2 | 64 | 112 | 112 | 112 | 144 | 144 | 144 | 176 | 176 | 208 | 208 | 224 | 64 | 112 | 144 | 176 |
| 0.9 | 64 | 64 | 64 | 112 | 112 | 144 | 144 | 176 | 176 | 208 | 208 | 224 | 224 | 112 | 144 | 176 |
| 0.6 | 64 | 64 | 64 | 112 | 112 | 144 | 144 | 176 | 176 | 208 | 208 | 224 | 224 | 64 | 144 | 176 |
| 0.3 | 64 | 64 | 64 | 64 | 112 | 112 | 144 | 144 | 176 | 176 | 208 | 208 | 224 | 64 | 144 | 176 |

HORIZONTALLY LEFT TO RIGHT IN TABLE IS ALONG X AXIS IN DIAGRAM OF LENS (μm).

VERTICALLY BOTTOM TO TOP IN TABLE IS ALONG Y AXIS IN DIAGRAM OF LENS (μm).

FIG. 26A

| | 5.1 | 5.4 | 5.7 | 6 | 6.3 | 6.6 | 6.9 | 7.2 | 7.5 | 7.8 | 8.1 | 8.4 | 8.7 | 9 | 9.3 | 9.6 | 9.9 |
|---|---|---|---|---|---|---|---|---|---|---|---|---|---|---|---|---|---|
| 9.9 | 0 | 0 | 0 | 0 | 0 | 0 | 0 | 0 | 0 | 0 | 0 | 0 | 0 | 0 | 0 | 0 | 0 |
| 9.6 | 0 | 0 | 0 | 0 | 0 | 0 | 0 | 0 | 0 | 0 | 0 | 0 | 0 | 0 | 0 | 0 | 0 |
| 9.3 | 0 | 0 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 | 0 |
| 8.7 | 0 | 0 | 0 | 0 | 0 | 0 | 0 | 0 | 0 | 0 | 0 | 0 | 0 | 0 | 0 | 0 | 0 |
| 8.4 | 176 | 208 | 0 | 0 | 0 | 0 | 0 | 0 | 0 | 0 | 0 | 0 | 0 | 0 | 0 | 0 | 0 |
| 8.1 | 144 | 176 | 208 | 0 | 0 | 0 | 0 | 0 | 0 | 0 | 0 | 0 | 0 | 0 | 0 | 0 | 0 |
| 7.8 | 64 | 112 | 144 | 176 | 0 | 0 | 0 | 0 | 0 | 0 | 0 | 0 | 0 | 0 | 0 | 0 | 0 |
| 7.5 | 208 | 224 | 112 | 144 | 176 | 208 | 0 | 0 | 0 | 0 | 0 | 0 | 0 | 0 | 0 | 0 | 0 |
| 7.2 | 176 | 208 | 224 | 64 | 144 | 176 | 208 | 0 | 0 | 0 | 0 | 0 | 0 | 0 | 0 | 0 | 0 |
| 6.9 | 144 | 176 | 208 | 224 | 64 | 144 | 176 | 208 | 0 | 0 | 0 | 0 | 0 | 0 | 0 | 0 | 0 |
| 6.6 | 64 | 144 | 176 | 208 | 208 | 64 | 144 | 176 | 208 | 0 | 0 | 0 | 0 | 0 | 0 | 0 | 0 |
| 6.3 | 224 | 64 | 144 | 176 | 208 | 208 | 64 | 144 | 176 | 0 | 0 | 0 | 0 | 0 | 0 | 0 | 0 |
| 6 | 208 | 224 | 64 | 144 | 176 | 208 | 224 | 64 | 144 | 176 | 0 | 0 | 0 | 0 | 0 | 0 | 0 |
| 5.7 | 176 | 208 | 224 | 64 | 144 | 176 | 208 | 224 | 112 | 144 | 208 | 0 | 0 | 0 | 0 | 0 | 0 |
| 5.4 | 144 | 176 | 208 | 224 | 64 | 144 | 176 | 208 | 224 | 112 | 176 | 208 | 0 | 0 | 0 | 0 | 0 |
| 5.1 | 64 | 144 | 176 | 208 | 224 | 64 | 144 | 176 | 208 | 64 | 144 | 176 | 0 | 0 | 0 | 0 | 0 |
| 4.8 | 224 | 64 | 144 | 176 | 208 | 224 | 112 | 144 | 208 | 224 | 112 | 176 | 208 | 0 | 0 | 0 | 0 |
| 4.5 | 208 | 224 | 112 | 144 | 176 | 208 | 224 | 144 | 176 | 208 | 224 | 144 | 176 | 0 | 0 | 0 | 0 |
| 4.2 | 208 | 208 | 224 | 112 | 176 | 208 | 224 | 64 | 144 | 176 | 208 | 64 | 144 | 208 | 0 | 0 | 0 |
| 3.9 | 176 | 208 | 224 | 64 | 144 | 176 | 208 | 224 | 112 | 176 | 208 | 224 | 144 | 176 | 0 | 0 | 0 |
| 3.6 | 144 | 176 | 208 | 224 | 112 | 144 | 208 | 208 | 64 | 144 | 176 | 224 | 112 | 176 | 208 | 0 | 0 |
| 3.3 | 144 | 176 | 208 | 208 | 64 | 144 | 176 | 208 | 224 | 112 | 176 | 208 | 64 | 144 | 208 | 0 | 0 |
| 3 | 112 | 144 | 176 | 208 | 224 | 112 | 144 | 208 | 224 | 64 | 144 | 208 | 224 | 112 | 176 | 0 | 0 |
| 2.7 | 64 | 112 | 176 | 208 | 208 | 64 | 144 | 176 | 208 | 64 | 144 | 176 | 208 | 64 | 176 | 208 | 0 |
| 2.4 | 224 | 112 | 144 | 176 | 208 | 224 | 112 | 176 | 208 | 224 | 112 | 176 | 208 | 64 | 144 | 208 | 0 |
| 2.1 | 224 | 64 | 144 | 176 | 208 | 224 | 64 | 144 | 208 | 224 | 64 | 176 | 208 | 224 | 144 | 176 | 0 |
| 1.8 | 208 | 224 | 112 | 144 | 208 | 208 | 64 | 144 | 176 | 208 | 64 | 144 | 208 | 224 | 112 | 176 | 0 |
| 1.5 | 208 | 224 | 64 | 144 | 176 | 208 | 224 | 144 | 176 | 208 | 224 | 144 | 176 | 208 | 112 | 176 | 0 |
| 1.2 | 208 | 224 | 64 | 144 | 176 | 208 | 224 | 112 | 176 | 208 | 224 | 144 | 176 | 208 | 64 | 176 | 208 |
| 0.9 | 208 | 224 | 64 | 144 | 176 | 208 | 224 | 112 | 176 | 208 | 224 | 112 | 176 | 208 | 64 | 144 | 208 |
| 0.6 | 208 | 208 | 224 | 112 | 176 | 208 | 224 | 64 | 144 | 208 | 224 | 112 | 176 | 208 | 64 | 144 | 208 |
| 0.3 | 208 | 208 | 224 | 112 | 176 | 208 | 224 | 64 | 144 | 208 | 224 | 112 | 176 | 208 | 64 | 144 | 208 |

HORIZONTALLY LEFT TO RIGHT IN TABLE IS ALONG X AXIS IN DIAGRAM OF LENS (μm).

VERTICALLY BOTTOM TO TOP IN TABLE IS ALONG Y AXIS IN DIAGRAM OF LENS (μm).

FIG. 26B

| | ZONE WIDTH (μm) | STEERING ANGLE (DEGREES) |
|---|---|---|
| ZONE 1 | 1.66 | 17 |
| ZONE 2 | 1.30 | 23.7 |
| ZONE 3 | 1.14 | 26.9 |
| ZONE 4 | 1.00 | 29.5 |
| ZONE 5 | 0.93 | 33 |

FOCUSING METASURFACE-BASED REFLECTOR FOR IMAGE RENDERING

TECHNICAL FIELD

The described embodiments relate to metasurface-based flat optics, and in particular to ultrathin reflective metalenses.

BACKGROUND INFORMATION

Optical lenses and mirrors are critical components in many modern systems and applications. Based on their focusing mechanism, currently prototyped and produced optical lenses can be classified into three categories: geometrical lens (concave/convex lens), diffractive lens (for example, Fresnel lens), and meta-surface-based optical lens or metalens. A concave (convex) lens relies on direct wavefront bending in which a sizable phase shift needs to be distributed. This typically leads to bulky device size due to the length of the optical path required. A diffractive lens, in contrast, only requires the phase range across the lens to the modulo of $2\pi$; therefore, the size (out of plane height) of the lens can be significantly reduced. The optical phase profile of a typical metalens is similar to that of a diffractive lens but differs in the phase shift mechanism. For a metalens, the phase is induced via the resonant response of the subwavelength nano/meta-structures, instead of modulating optical path within the (different refractive index) lens material as in the case of a diffractive lens. Although the realistic advantages of a metalens over a diffractive lens are still a subject of debate, it is widely consented that a metalens can be made thinner (size reduction), more lithographically compatible, and potentially endowed with more versatile photonic functionalities that are not attainable in diffractive lens.

The commercialization of such technology requires a mature fabrication process that can effectively scale up its manufacturing capability. One potential process that can be considered beyond the low-throughput wafer-scale manufacturing is Nanoimprint Lithography (NIL), which has shown great potential in mass producing various nanophotonic devices to the commercialization phase. NIL-based mass manufacturing starts with wafer-scale processing and scales-up using a step-and-repeat mechanism in order to generate a tooling stamp than can copy a large number of devices in roll-to-plate or roll-to-roll setups. For NIL, the quality of the devices is dictated by the geometric aspect ratio (height/width) of the fabricated structures. In a transmissive metalens, the height of the meta-structures (also called meta-atoms) is typically on the scale of several hundreds of nanometers to a few micrometers. Such structures are challenging to manufacture through NIL process because the high aspect ratio (>10) normally impedes a high-fidelity replication depending on the feature size and the viscosity of the NIL polymer (fidelity is defined as the morphological resemblance of the replicated nanostructures to the mold in the nanoimprinting process). There is such a height requirement because the phase production mechanism within the transmissive metalenses relies on the refractive index difference between the dielectrics composing the meta-atom and background, which is typically not sizeable enough (refractive index contrast is <0.7 assuming the meta-atoms are encapsulated by lower refractive index protective polymer) to support low aspect ratio lenses.

Alternatively, traditionally prototyped reflective metalenses use a reflective thin film metal at one side of the lens body and operate in the reflection mode. Owing to the doubled optical path of the optical wave after reflection, the targeted phase shift can be achieved by approximately half the aspect ratio as in fully transmissive metalens counterparts. From the manufacturing point of view, such reflective metalenses, which combine a lower-aspect-ratio transmissive lens and a flat reflective layer, are less challenging to fabricate compared to the fully transmissive ones, but are still not straightforward to make in a roll-to-plate or roll-to-roll setup.

SUMMARY

The disclosed embodiments relate to the field of metasurface-based ultraflat optics, and more particularly to the design of a plasmonic Focusing Reflector (FR) compatible with scalable manufacturing processes such as Nanoimprint Lithography (NIL). In addition to security feature application and optically variable devices for authentication, the disclosed embodiments have general applicability and have applications in near-eye display optics, augmented reality, virtual reality, and mixed reality.

In accordance with one novel aspect, a fully plasmonic Focusing Reflector (FR) metalens has a reduced aspect ratio. The metal coating film not only mirror-reflects the optical wave backward, but it also induces a plasmonic resonant effect. The phase inducing mechanism is advantageously leveraged for designing an improvement to known reflective metalenses that has an improved lower aspect ratio and has no need to employ high index dielectrics. Due to its lower aspect ratio structures, the novel plasmonic metalens is more commercially scalable when using Nanoimprint Lithography (NIL) processes. Notably, although plasmonic-induced phase shift may also lead to a change in amplitude responses, sufficient optical and focusing efficiencies are achievable at small focal lengths.

A design and prototyping platform is described in this patent document. The platform enables the design of ultrathin and manufacturable Focusing Reflector (FR) metalenses for visible wavelengths. Different numerical aperture (NA) FR metalenses can be considered and implemented based on the disclosed platform. The material constituting the imprinted pattern of low aspect ratio (height/width<2) meta-atoms is not restricted by its refractive index and does not need to be different from the background matrix. A thin metal film is deposited atop the constituent pillar structures thereby forming meta-atoms that induce the desired plasmonic effect and phase shift. Maximum phase shift coverage is achieved by modulating the width of the square shaped meta-atoms at certain meta-atom thicknesses across the lens, and this makes the meta-atoms compatible with existing NIL processes without suffering from high fidelity loss due to the low aspect ratio structure.

In one novel aspect, a security feature includes a reflective metalens structure, a second layer of dielectric material disposed over the reflective metalens structure, and a reflective pixel object. The reflective metalens structure comprises an array of low aspect ratio (height/width<2) meta-atoms extending in a first plane to form a plurality of concentric Fresnel zones. Each of the meta-atoms comprises a pillar of dielectric material that extends from a first layer (for example, from a cladding layer) of the dielectric material. Each meta-atom further comprises a layer of metal disposed on an end-face of such a pillar. The second layer of dielectric material (for example, an embossed layer) is disposed over the entire reflective metalens structure. The reflective pixel object is disposed over the reflective metalens structure and extends in a second plane such that the principal axis of the reflective metalens structure passes through the reflective pixel object. The first plane in which the reflective metalens extends is parallel to the second plane in which the reflective pixel object extends. In one example, the reflective metalens structure extends in the first plane over a first area A1 in the first plane, and the reflective pixel object extends in the second plane over a second area A2. A2 is less than ten percent of A1. The reflective metalens has a focal distance of less than 100 microns and has a full width at half maximum (FWHM) region that is less than 1.5 microns wide when the metalens is illuminated with 530 nanometer wavelength light (rays of incident light passing toward the metalens are normal to the first plane of the metalens).

In a novel aspect, a plasmonic metasurface of meta-atoms is disposed in a plane facing away from the direction of incoming incident light. In an example of a film of security features with an adhesive layer, the plasmonic metasurface of a reflective pixel object faces the layer of adhesive. In an example of a film of security features attached to a substrate (for example, attached to a banknote) the plasmonic metasurface of a reflective pixel object faces the substrate. The reflective pixel object comprises a first sub-pixel portion and a second sub-pixel portion. The first sub-pixel portion comprises a first plurality of meta-atoms, and the second sub-pixel portion comprises a second plurality of meta-atoms. The plasmonic metasurfaces of the first and second sub-pixel portions face away from the direction of incoming light, and toward the associated metalens. The plurality of meta-atoms of the first sub-pixel suppresses a portion of the visible spectrum of light more than the second plurality of meta-atoms of the second sub-pixel. The different sub-pixel portions therefore appear to a human viewer to have different colors. A security feature comprising an array of such metalenses and corresponding reflective pixel objects is perceived to reveal a first image when the security feature is viewed from a first viewing angle, whereas the security feature is perceived to reveal a second image when the security feature is viewed from a second viewing angle.

In one novel aspect, a novel method of making a film of such security films is disclosed, in which the steps of the method are carried out by a manufacturer of such films of security features. In another novel aspect, a novel structure is disclosed which comprises an item (for example, a security document or an item to be provided with a security feature) and an array of the security features that is attached to, and in some cases is incorporated into, the item. In such case, the novel structure is made by the manufacturer of the structure and item.

Further details and embodiments and methods and techniques are described in the detailed description below. This summary does not purport to define the invention. The invention is defined by the claims.

DESCRIPTION OF THE DRAWINGS

The accompanying drawings, where like numerals indicate like components, illustrate embodiments of the invention.

FIG. 1 is a perspective diagram of a generalized example of a plasmonic meta-atom usable as a building block in a metalens-designing platform described in this patent document.

FIG. 2 is a cross-sectional diagram of the meta-atom of FIG. 1.

FIG. 3 is a pair of tables that set forth ranges of dimensions of the meta-atom of FIG. 1 and FIG. 2.

FIG. 4 is a diagram that illustrates the phase profile and the focusing mechanism of a typical concave lens.

FIG. 19N illustrates a next step in the method of making the metalens.

FIG. 19O illustrates a next step in the method of making the metalens.

FIG. 19P illustrates a next step in the method of making the metalens.

FIG. 20 is a diagram of a bank note to which a novel security feature made in the method of FIGS. 19A-19P is attached.

FIG. 26A is a table that shows the widths of some of the meta-atoms of the metalens of FIG. 25.

FIG. 26B is a table that shows the width of others of the meta-atoms of the metalens of FIG. 25.

DETAILED DESCRIPTION

Figure 5:
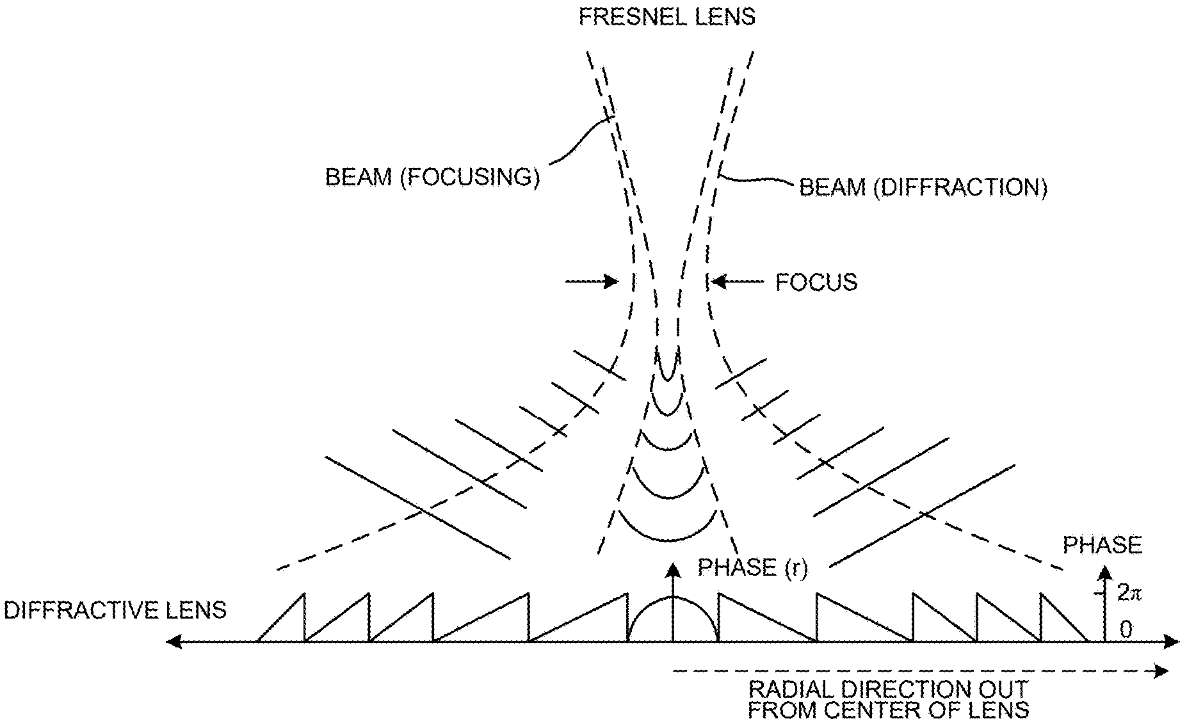
FIG. 5 is a diagram that depicts the phase profile and the focusing mechanism of a diffractive lens within the Fresnel/diffraction zones.

FIG. 1 is a perspective diagram of a generalized example of a plasmonic meta-atom 1 used for the implementation of a Focusing Reflector (FR). A metalens made up of plasmonic meta-atoms is an example of an FR. The structure of the meta-atom involves a first layer 3 of dielectric material and a second layer 2 of dielectric material. The second layer of dielectric material is not shown in FIG. 1.

FIG. 2 is a cross-sectional diagram of the generalized example of the meta-atom 1 of FIG. 1. The meta-atom structure 1 comprises a pillar 2 of dielectric material that extends upward (in the perspective of the diagram) from the first layer 3 of dielectric material. The pillar 2 is part of the first layer 3. A thin metal film or layer 4 (for example, silver, titanium, gold, or such) is disposed on the upward-facing end-face 5 of the pillar structure as illustrated. A second layer 6 of dielectric material covers the pillar structure as illustrated. In one example, the meta-atom structure 1 is fabricated in orientation with the second layer 6 of dielectric material being disposed on the bottom. The second layer 6 may, for example, be an NIL-embossed thermoplastic polymer of photopolymer sitting on a substrate material (may be flexible or not). The embossing forms a hole-like depression into the upward facing surface of the second layer 6. After embossing of the upward facing surface of the second layer, a thin layer of metal is deposited on the embossed second layer of dielectric. The metal coats all upward-facing surfaces of the second layer 6 of dielectric material, including the bottom surface of the hole. The diagrams of FIG. 1 and FIG. 2 are generalized in that in such case the metal on the end-face of the pillar does not extend laterally past the lateral edges of the end-face 5 of the pillar. After deposition of the thin layer of metal, the first layer 3 of dielectric material is deposited to fill the remainer of the hole and to provide a planar upper surface. This first layer 3 of dielectric material may be referred to as a cladding layer. After fabrication, if the structure is inverted, then the filled hole (that is filled with cladding material) appears as the pillar 2 as depicted in FIG. 2 extending upwards from the remainder of the first layer 3 of dielectric material. The dielectric material of the first and second layers may be low or high refractive index polymeric material. The dielectric material may be the same type of material and may be UV-curable resin that polymerizes under exposure to UV radiation.

The phase shift introduced to a plane wave propagating downward from the top of the meta-atom (in the perspective illustrated in FIG. 1 and FIG. 2) can be approximated by the phase difference between the wavefront reflected from the top metal surface and the wavefront reflected from the bottom metal surface. This approximate phase shift is, however, impacted by the absorption and transmission of the meta-atom, and therefore is dependent on the plasmonic dispersion and resonances of the subwavelength meta-atom. The phase shift acquired from individual meta-atoms may vary by changing the refractive index of the embossed polymer or the cladding polymer. The periodicity P of the meta-atoms is kept in the subwavelength scale to suppress any unwanted diffraction effect that may arise from a single meta-atom. Each meta-atom effectively functions as a local resonator within each unit lattice. For an incident plane wave, the underlying meta-atom therefore can impart different phase/amplitude on the reflected waves by varying the width of the meta-atoms, making the meta-atom a platform for the design of metalenses and other metasurface devices.

FIG. 3 is a pair of tables that set forth the ranges of dimensions of the meta-atoms of the platform. P denotes the period of the meta-atoms as illustrated in FIG. 2. The height $h_m$ denotes the height of the meta-atoms. The $d_m$ denotes the maximum width of the pillar portion of the meta-atom as illustrated in FIG. 2. The t denotes the thickness of the metal layer on the end-face of the pillar of the meta-atom.

Plasmonic grating metasurfaces made up of the meta-atoms can be fabricated in several different manufacturing methods. One method is a two-step NIL process that suffers less fidelity loss due to the low aspect ratio of the meta-atoms. At the wafer scale, electron beam lithography combined with anisotropic etching techniques are used to accurately shape the meta-atom structures into a stamp substrate (for example, stamp of silicon). The pattern of the stamp is then replicated to a photopolymer resin mold body, is demolded, is metalized, and the metal is removed so as to form a metal hard stamp. The pattern from the metal hard stamp can then be imprinted (embossed into) into a layer of polymer (for example, UV curable resin). A thin metal film is then deposited on the imprinted polymer to form the functional metasurface. Finally, another layer of dielectric material can be applied over the metal as a cladding layer. In this way, meta-atom structures resembling the meta-atom of FIG. 1 and FIG. 2 are formed. In the specific example illustrated, the cladding layer actually forms the pillars of the meta-atoms.

Substrate: The meta-atoms can be implemented on a hard (e.g., glass, quartz, sapphire) or on a flexible substrate (e.g., PET). Ideally, any dielectric (refractive index n typically between 1.3-3.6) that is mechanically stable can serve as the substrate for the proposed meta-atoms. The thickness of the substrate can be between a few microns to a few hundreds of microns thick.

Meta-atom: The pillar bodies of the meta-atoms are composed of a dielectric material (n: 1.3-1.9). The height $h_m$ of the meta-atoms is between 50 nm-500 nm and preferably between 50 nm-180 nm. The width $d_m$ of the meta-atoms varies between 150 nm and 500 nm, and preferably varies between 200-350 nm. The thickness $h_r$ of the first layer 3 of dielectric material under the meta-atoms can be between a few tens of nanometers and a few microns, preferably less than few hundreds of nm. The thickness of the first layer 3 in the configuration of FIG. 1 and FIG. 2 has negligible impact on the optical performance of the device.

Metal film: The thin metal film may be one of the following: Al, Ag, Au, Cu, Ni, Cr, Pt, and Pd. The thickness t of the metal film can range from 10 nm to 60 nm and preferably from 20 nm to 40 nm, if the plasmonic effect can be supported with a thin film reflectance of greater than 50% and more preferably greater than 70%.

Protective layer: The second layer 6 of dielectric that covers the meta-atom pillar structure is a transparent dielectric that does not exhibit unwanted optical absorption. The second layer 6 can be comprised of dielectrics, thermoplastic polymer, and/or photopolymers. The thickness of the second layer 6 ranges from 0.5 micron to 50 microns, and preferably 1 to 5 μm.

FIG. 4 is a diagram that illustrates the phase profile and the focusing mechanism of a typical concave lens. The wavefront is tailored or bent in accordance with the phase profile, directing the light toward the center focused (concave up). In a conventional concave lens, the phase production relies on the length of optical path the light can travel, typically by modulating the height of the materials. Various phase/height levels are required, while the optical performance and limitations of such lenses depend on the highest level achievable. For instance, a high NA concave lens requires a more abrupt phase increase across the lens, making it more challenging to be implemented when compared to small NA lens.

Concave lenses typically require a sizable "unwrapping" phase accumulation. From the perspective of a metasurface, such a wide-swing phase gradient is also barely achievable due to the subwavelength pitch dimension of the unit cell. As such, within the fields of metamaterials and metasurfaces as applied to security documents, there is no commercial concave lens design known to the inventors that is based on meta-atoms, although they remain a popular design of choice in the field of geometric optics.

FIG. 5 is a diagram that depicts the phase profile and the focusing mechanism of a diffractive lens within the Fresnel/diffraction zones. Contrary to a concave lens, the phase profile of the diffractive lens is based on Fresnel phase distribution, a phase "wrapping" feature to modulo of 2π. In a Fresnel lens, the phase profile exhibits a quasi-periodic pattern characterized by different zones. These zones diffract light toward the center; whereas the fields on either side of the lens will constructively interfere with each other and facilitate focusing.

The focusing of a diffractive lens therefore can be attributed to the two above-mentioned mechanisms: focusing and diffraction. Through the interplay between focusing and diffraction regions, one can more flexibly design optical lenses with varying specifications based on Fresnel phase equation. Such a diffractive configuration can be implemented using binary grating, multilevel blazed structure, or meta-atoms, in either micron or nano scale footprint. There have been several known conventional demonstrations of diffractive lenses capable of high NA focusing with good focusing efficiency.

Although also relying on optical ray path for incurring phase shift, a diffractive lens offers several design advantages not attainable in a concave lens. Because the phase is bounded within modulo of 2π, the height of the structure required for a diffractive lens is significantly reduced, which makes diffractive lenses more suitable for nanoimprint lithography (NIL) processes. Additionally, a diffractive lens can achieve high NA focusing without the need to increase the phase/height of the constituent structures due to its diffraction-based periodic phase distribution. These two advantages alleviate design constraints imposed on a concave lens, making a diffractive lens a more popular platform of choice for integrable solutions when compared to concave lenses.

Figure 6:
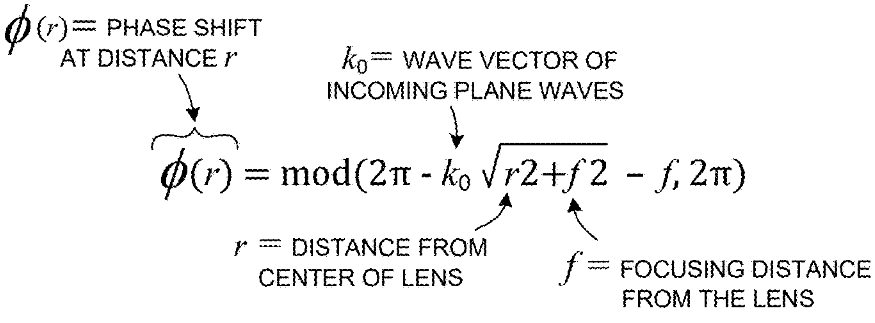
FIG. 6 sets forth an equation that defines the phase profile of a Fresnel lens.

FIG. 6 sets forth an equation that defines the phase profile of a Fresnel lens.

Figure 7:
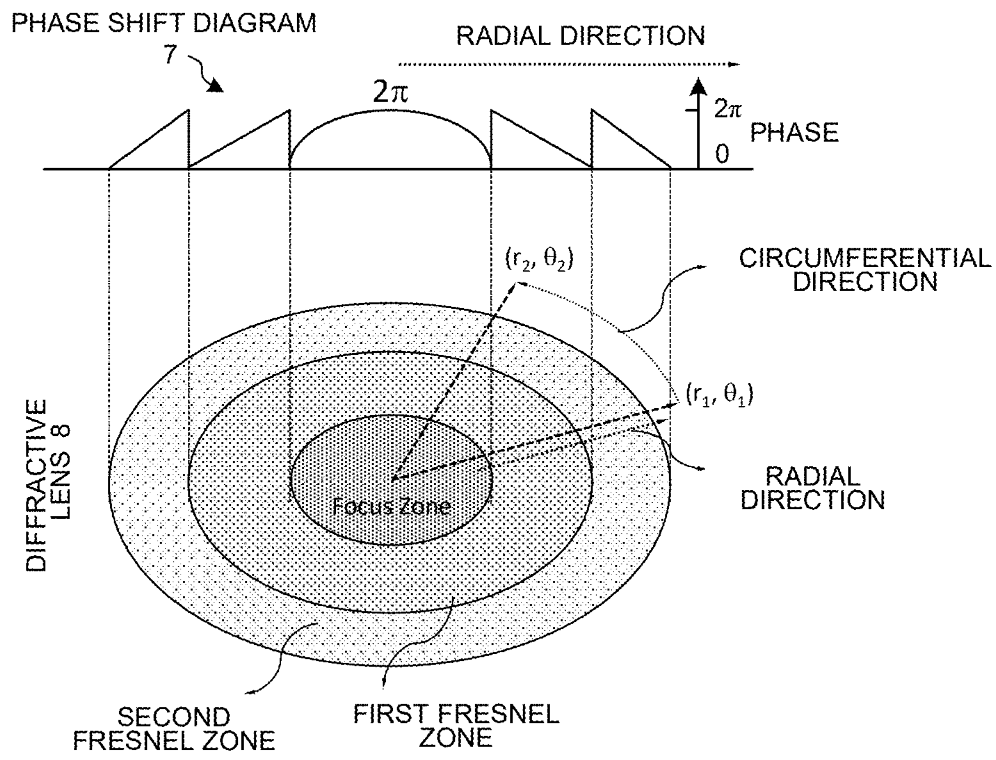
FIG. 7 illustrates the phase diagram of a typical Fresnel lens.

FIG. 7 illustrates the phase diagram 7 of a typical Fresnel lens 8. The Fresnel phase profile follows the equation of FIG. 6, where f and k0 are the focusing distance from the lenses and the wave vector of the incoming plane waves, respectively, and where r is the distance from the lens center.

Figure 8:
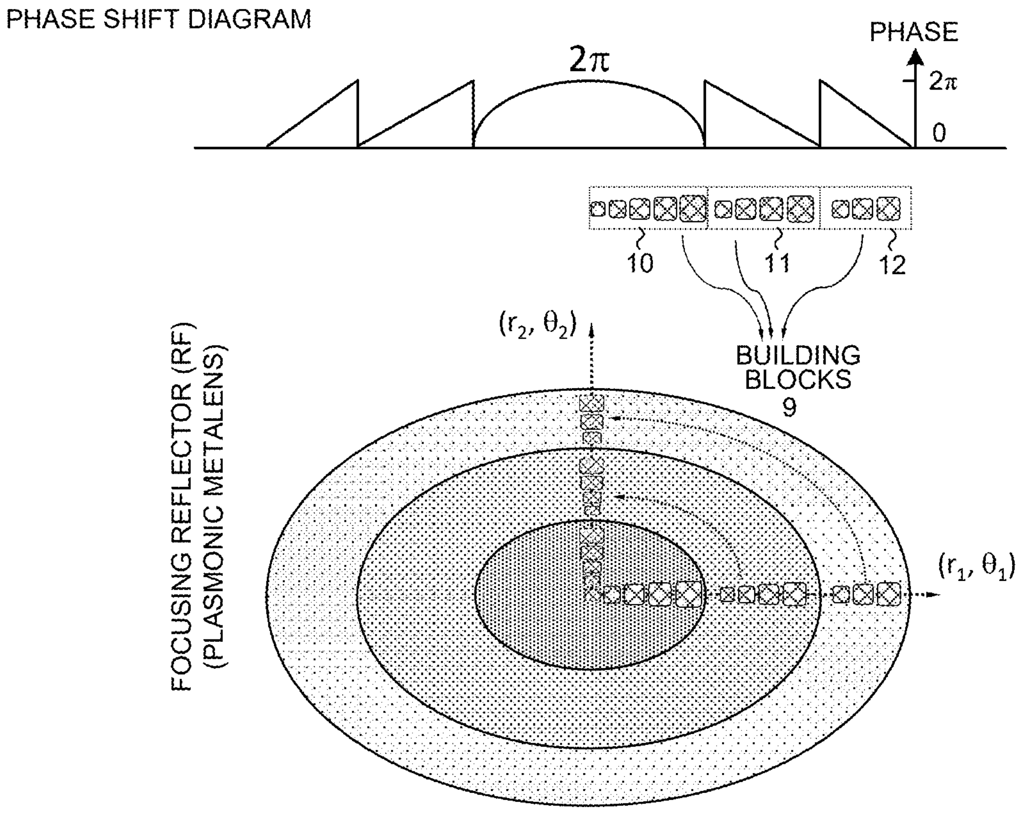
FIG. 8 shows how the phase shift induced by a Fresnel diffractive lens illustrated in FIG. 7 can be approximated by meta-atoms that are arranged with a gradient in size as depicted in FIG. 8.

FIG. 8 shows how the phase shift induced by a Fresnel diffractive lens illustrated in FIG. 7 can be approximated by meta-atoms arranged with gradient in size as depicted in FIG. 8. In a design of a metalens, meta-atoms are assembled as building blocks to implement the phase gradient observed in a typical Fresnel lens: along the axial direction, the phase profile of a circular diffractive lens is symmetric with respect to the lenses' center, exhibiting a quasi-periodic pattern maximally bounded by 2π. To produce a symmetric phase profile similar to that of the centrosymmetric diffractive lens, meta-atoms should be distributed in a cylindrically symmetric manner along the circumferential direction. As the zone width decreases when the number of Fresnel zones increases, the building blocks based on meta-atoms should change accordingly. Such phase-enabled building blocks 9 as shown in FIG. 8 may be composed of meta-atoms as depicted in FIG. 1 and FIG. 2, if the phase shift can be available via plasmonic resonance within such meta-atoms.

In the example of FIG. 8, the total phase shift produced in each diffractive building block is realized by the phase gradient resulting from the placement of differently sized subwavelength meta-atoms. Notice that the plasmonic meta-atoms utilized are subwavelength (below diffraction limit for the visible wavelength light) and do not diffract if placed in a periodic lattice. However, when combined with differently sized meta-atoms to form a diffractive "meta-cell", this building block steers light based on the gradient of the cell. In the example of FIG. 8, only square like meta-atoms are shown. There are three meta-cells 10, 11 and 12. However, differently shaped meta-atoms may also be combined to build a meta-cell.

Figure 9:
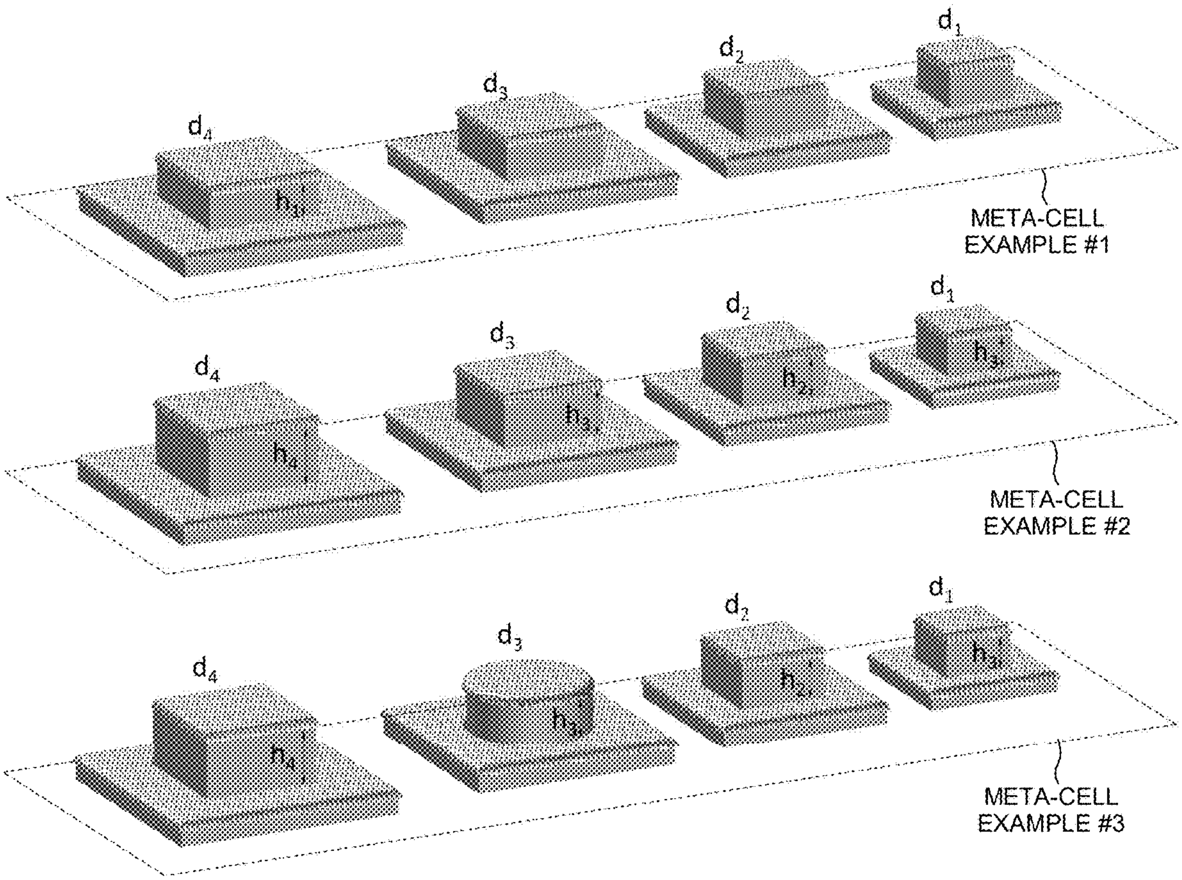
FIG. 9 illustrates three different examples of meta-cells.

FIG. 9 illustrates three different examples of meta-cells.

Top panel of FIG. 9: All meta-atoms of the meta-cell illustrated in the top panel of FIG. 9 have an identical shape (the end-face of each pillar is square) and have an identical height. The necessary phase gradient is achieved by modulating the in-plane size of the meta-atoms as illustrated.

Middle panel of FIG. 9: All meta-atoms of the meta-cell illustrated in the middle panel of FIG. 9 have an identical shape (the end-face of the pillar is square), but the heights of the meta-atoms and the in-plane dimensions of the meta-atoms are selectively changed as illustrated to gain the desired phase gradient.

Bottom panel of FIG. 9: The meta-atoms of the meta-cell illustrated in the bottom panel of FIG. 9 are of varied shape and size so as to construct the necessary phase gradient. Upon manufacturability of differently shaped meta-atoms, the variety in size and shape adds flexibility to the design process in reconstructing a linear phase in accordance with the equation of FIG. 6. The manufacturing complexity of the first category, even at the wafer scale, can be realized when the manufacturing process of the nanoimprinted meta-atoms is considered.

Meta-atoms at the wafer scale may be made using high-resolution lithography techniques, such as electron beam lithography. In one such method, a hard stamp is made. A thin layer of electron beam resist is spun on a hard substrate such as a silicon wafer substrate. The resist is exposed by the electron beam to be removed, leaving an opening in the resist comparable to the base of the meta-atom in size. The substrate and resist stack is then coated with a thin metallic or dielectric film using physical vapor deposition. The resist thickness is typically chosen below 400 nm to enable high-resolution patterning with electron beam lithography. The thickness of the metallic or dielectric masking film is dependent on the subsequent plasma etching step and is usually chosen <50 nm for a highly selective plasma etching process. It is preferred to use deposition methods that lead to non-conformal coverage of the thin film on the resist to facilitate a lift-off process after the deposition. In this lift-off process, the metallic or dielectric thin film is deposited on both non-patterned resist and the substrate within the opening area. Using a liftoff process, the resist and the thin film on top are removed, leaving the metallic or dielectric mask with a surface area and shape comparable to that of the meta-atom's base.

In the next step of the method of making the hard mask, the substrate is etched using an anisotropic plasma etching process forming pillars of meta-atoms under the masked areas. The etch selectivity, defined as the ratio between the etching rate of the substrate and the etching rate of the metallic (dielectric) mask, determines the height of the atoms in the substrate. The mask layer may be removed using a subsequent wet or dry etching step once the meta-atoms with the desired in-plane size and height are formed in the substrate. The height of the meta-atoms may be different depending on the in-plane size of the meta-atom because plasma etching process is a combination of physical and chemical etching in the plasma chamber where the etch depth becomes a function of opening (non-masked) area. The dry etching process may be fine-tuned to control the height of differently sized meta-atoms relatively similar but removing or reducing the height gap between the differently sized meta-atoms smaller than 20% is challenging, depending on the size difference.

The patterned substrate embedding a variety of differently shaped and sized meta-atoms is called a hard stamp. A mold using polymer material is utilized to copy a negative polarity of the hard stamp and the mold is then utilized to copy nanoimprinted FRs with a polarity identical to that of the stamp. Both copying processes are dependent on the polymer type, viscosity, shrinkage coefficient, as well as pressure, speed, and curing time of the employed polymers. Differently sized meta-atoms experience different fidelity factors to their equivalent meta-atom in the stamp with the likelihood of significant (up to 20%) reduction in height.

Based on the description above and because of the height variations in both plasma etching and imprinting steps, realization of equally high meta-atoms is challenging. The metalens disclosed in this patent document assumes that the final height of the imprinted meta-atoms may differ based on the manufacturing process. Therefore, the design process is composed of the following steps:

1) Meta-atoms may be designed using a full-wave electromagnetic solver. A finite difference time domain (FDTD) technique is used to model the sub-wavelength meta-atoms in a periodic lattice. This simulation provides a first-step estimation of the phase and amplitude of the sub-wavelength plasmonic meta-atom. In this way a library of meta-atoms with various sizes, heights, and phase retardations is built. In the first phase of the design, however, the height of all meta-atoms is considered identical because deterministic fine tuning of the meta-atom height in the full manufacturing process without factoring in the fabrication steps is difficult.
2) Calibration lattices of meta-atoms are fabricated using electron beam lithography, plasma etching, and nanoimprint lithography as explained above. A certain theoretical height is targeted in the plasma etching step, and the final height at the end of the full nanoimprinting cycle is measured using device metrology techniques. The height of meta-atoms changes based on their base size. A library of meta-atom base size and height is then created for calculating phase retardation which is a redo of the first step described above, but using updated heights.
3) The phase of the FR zone is reconstructed to produce the phase of the corresponding Fresnel zone and by "mixing and matching" the meta-atoms. The phase wrapping function of a meta-cell within each zone of the FR causes discontinuity at the zone boundaries (as seen in FIG. 8), but the in-plane size and height of the meta-atom can be accordingly adjusted to minimize the error from the ideal phase profile of the Fresnel counterpart.
4) When plasmonic meta-atoms with their respective phase shift are arranged in a meta-cell or a Fresnel zone to produce a $2\pi$ phase shift, the meta-cell becomes quasi-periodic, and the phase shift of individual meta-atoms calculated with periodic boundary conditions in a periodic lattice is no longer accurate. The accurate phase shift and steering angle of each meta-cell should also account for the plasmonic intercoupling between the constituting meta-atoms. To this end, the phase gradient of each meta-cell is first approximated by the phase shift of individual meta-atoms when placed together and is then recalculated as a separate diffractive building block to capture the plasmonic intercoupling. The coupling caused by positioning meta-cells adjacent to each other is then second order perturbation and may be considered for the few first zones of the FR, depending on the zone size and computational capacity.

Figure 10:
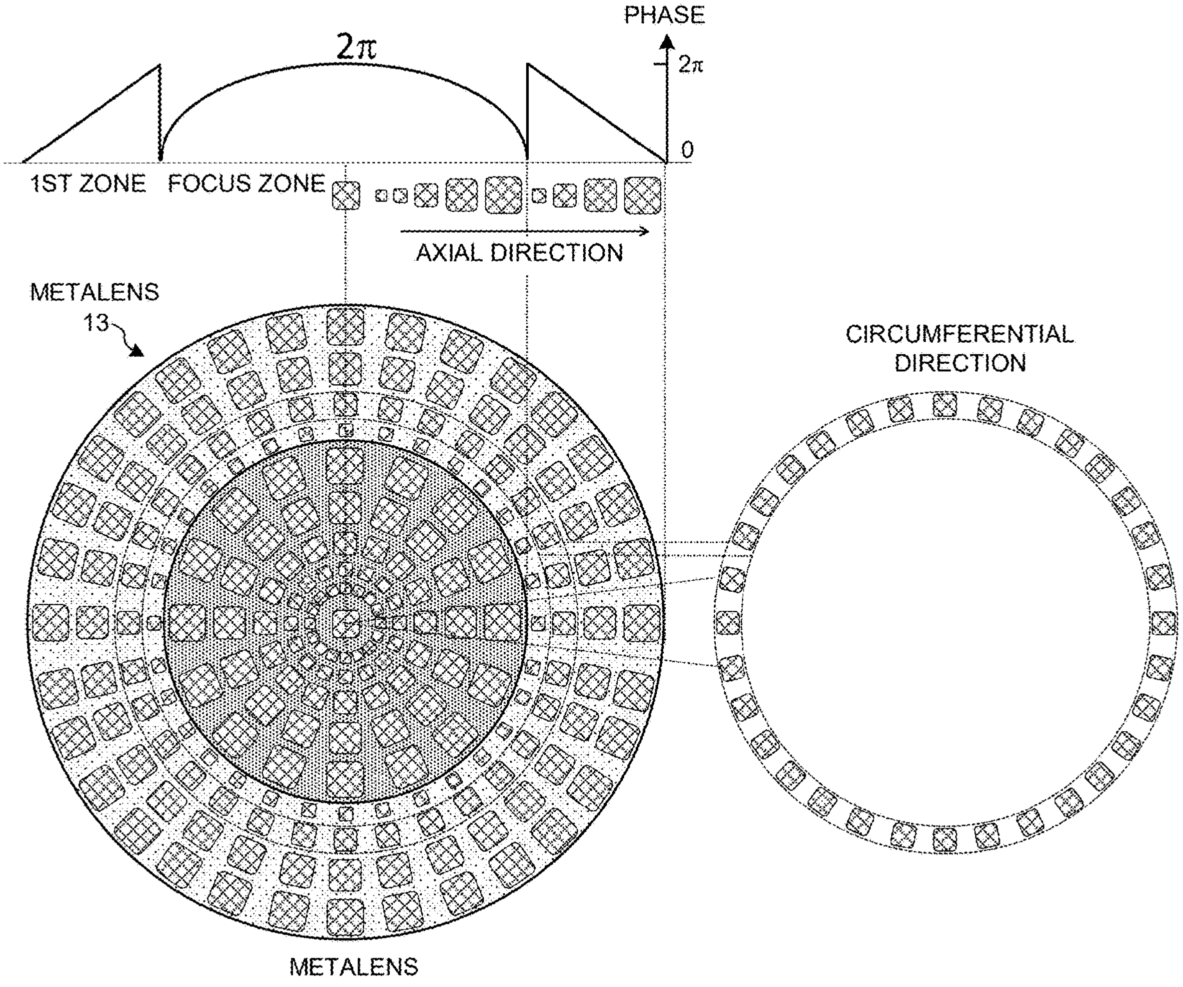
FIG. 10 is a depiction of a coaxial metalens that has two Fresnel zones focused at a focal point.

FIG. 10 is a depiction of a coaxial FR (a metalens) 13 that has two Fresnel zones focused at a focal point. The meta-atoms of each Fresnel zone are based on the meta-cell building blocks of phase-enabled plasmonic meta-atoms. Design considerations and characteristics of the metalens (the FR) are discussed below.

1) Design Considerations

1a) Meta-atom composing FRs: The height of the meta-atoms shown in FIG. 10 should be judiciously chosen such that the phase coverage can be maximized. Optical resonance based on plasmonics can allow for phase shift engineering with reduced meta-atom thickness, which is more suitable for NIL fabrication because of the smaller geometrical aspect ratio of the pillar structures. Ultra-strong plasmonic resonant meta-atoms are also not suitable due to accompanying high absorption loss which negatively impacts device efficiency. Additionally, the pitch dimensions of the unit cell should be in the subwavelength regime to avoid any unwanted diffraction within the cell, which leads to higher order field scattering not conducive to optical focusing. Meta-atoms as shown in FIG. 10 are a good platform of choice for the design of FRs.

1b) Assembly of various Meta-atoms as fundamental building block: Meta-atoms composing FRs must be able to tailor the phase profile across the FRs spatially. For example, by cascading two meta-atoms of different width supporting various phases, the two atoms combined should provide a phase gradient within the supercell. Such a capability is essential for FR design, because their desired phase profile is primarily enabled by modulating the lateral dimension of meta-atoms structurally. These phase-capable building blocks form the basis for light focusing of the FR.

1c) Focusing and Fresnel Zones: Because the phase profile of an FR is based on the Fresnel phase equation, the focusing characteristics and quality of the FR depends on the actual phase distributions within these regions. The center focusing region requires a Meta-atom distribution that is symmetric with respect to the lens center (primary axis of the lens) while providing a parabolic-like phase profile along the axial axis. On the other hand, in Fresnel zones the meta-atoms should provide a quasi-linear phase profile. The width of the Fresnel zone will become reduced as the distance between the zones and the lens center increases, which limits the number of meta-atoms that can be assembled within. The phase profile within these faraway zones can be challenging to produce due to overly narrow zone width, which dictates the ultimate available efficiency of the FR.

1d) Lenses focusing: In contrast to conventional concave lenses, the focusing mechanism of the metalens is through the interplay between the focusing and Fresnel regions, characterized by Fresnel phase equation. The phase mechanism in the centralized focused zone is similar to that of concave lenses, whereas the mechanism within the Fresnel zone is based on optical diffraction. The assembled meta-atoms therefore should provide an accurate phase manifestation in each region for the best focusing effect. In general, the meta-atom phase profile will deviate more from Fresnel phase equation as the number of Fresnel zones increases, which should be especially considered for higher NA focusing.

2) Factors Impacting Available Efficiency

2a) Reflection efficiency: For reflection-based photonic devices, the amount of power that can be reflected is an important design metric. Plasmonic reflecting meta-structures typically suffer from lower reflection efficiency as compared to dielectric reflecting metastructures due to inherent material absorption of metal. Another factor that impacts reflection efficiency is the plasmonic resonance of meta-atoms, as the phase shift incurred will concur with a drop in reflection power. The meta-atom configurations therefore should not only provide necessary phase coverage but should also provide appreciable reflectance for the optimal balance between focusing and reflection efficiency.

2b) Transmission efficiency: Excessive transmittance restricts the maximal amount of reflected power that can be obtained from a metalens. One straightforward means to reduce transmittance of meta-atoms is to increase the thickness of the metal film, because electromagnetic waves can penetrate through metals if the thickness of metal is thinner than skin depth. An overly thick metal, on the other hand, may compromise the plasmonic effect available, which requires a balance between transmission and phase shift.

2c) Absorption: Material absorption of metal along with the plasmonic resonance absorptive loss of meta-atoms constitute the two primary streams of absorption in the FR configuration. Material absorption is inherent to the material constituents of meta-atoms and is intrinsic to the metal being used. For instance, a silver-based plasmonic meta-atom may suffer less material absorption as compared to a copper-based plasmonic meta-atom. On the other hand, the strength of "plasmonic resonance" can be extrinsic to meta-atom design, tailored to supporting lower energy loss. In general, plasmonic meta-atoms relying on more extreme symmetry breaking in geometry typically are more absorptive than their symmetric counterparts.

2d) Unwanted diffraction: The operation of a metalens depends on the Fresnel phase profile. Unwanted diffraction can occur when the produced phase profile deviates significantly from Fresnel equation, particularly in Fresnel zones with larger zone numbers. Such unwanted diffraction due to phase aberration will result in reduced focusing efficiency. Another potential source of unwanted diffraction is the design of the meta-atom. At the meta-atom level, the pitch dimension of unit cell should be in subwavelength scale to better suppress any diffraction within the cell.

3) Factors Impacting Optical Properties

3a) Focal length/distance: The focal length is the distance between the focal plane and the plane of the lens. Based on the Fresnel equation, a metalens can be designed to focus at a desired distance. In the centralized focusing zone, the design of focal length is similar to that of concave lenses, depending on the gradient of the phase shift distributed across the zone. Outside of the focusing zone, diffraction from Fresnel zones aims at steering the light toward the same focal point as the focusing zone. If the phase shift obtained in a meta-cell or a Fresnel zone is significantly less than $2\pi$, then the focal distance will deviate from the Fresnel prediction due to compromised phase shift coverage.

3b) Chromatic dispersion: Chromatic dispersion arises when the designed metalens is sensitive to operational wavelength, which fails to focus all colors at the same location. This is due to material and structural dispersive behaviors, as meta-atom characteristics and Fresnel phase profile are inherently wavelength dependent. Monochromatic metalenses are typically only operable within a limited range of wavelengths. Further dispersion compensation needs to be considered to mitigate the chromatic dispersion and expand the operation of metalenses to multiple colors. Chromatic dispersion is noticeably affected by plasmonic resonances at visible wavelengths in the metalens introduced here. The plasma frequency of metals used in the manufacturing process of the novel metalens described here lies near short visible or UV wavelengths, leading to both material and modal dispersion of the atoms at the targeted operation wavelength. Material and modal dispersion could negatively show their impact in absorption and wavelength-dependent suppression of the reflection spectrum.

3c) The f number: The f number is defined to be the ratio of focal distance over the diameter of the lens. For a metalens, a smaller f number requires the metalens to focus at a shorter distance (relative to lens diameter) with increased Fresnel zone number, which impacts the efficiency of diffraction. As such it is generally more challenging to design smaller f number lenses as compared to large ones.

3d) Spectral bandwidth: In addition to focal distance, another important optical property that is sensitive to operational wavelength is the focusing efficiency. Because plasmonic meta-atoms are dependent upon plasmonic resonance to incur phase shift, they are wavelength sensitive. As such, the phase shift available may compromise as a function of wavelength, which in turn may lead to a drop in efficiency with limited spectral bandwidth operation.

3e) Angular bandwidth: A metalens is designed to focus normally incident (normal to the plane of the lens) light waves to a point called the focal point. Because the phase response of meta-atoms is sensitive to the angle of incidence, the focusing location, along with efficiency, will change when the light source is obliquely incident. Operations the metalens is therefore subject to a certain angular range of light sources.

3f) Focusing efficiency: The focusing efficiency dictates the amount of energy confined within the beam spot on the focal plane. Typically, a smaller f number or higher NA lens which requires a denser Fresnel zone distribution will exhibit a smaller focusing efficiency due to compromised quality of Fresnel zone diffraction. Focusing efficiency is more sensitive to phase aberrations than amplitude, which in most scenarios has a stronger impact on the reflection efficiency.

3g) FWHM: The "full width at half maximum" (FWHM) is another important metric for the metalens because it dictates the quality of focusing spatially. The FWHM is defined to be the ratio of 1) intensity integrated in the FWHM region, to 2) intensity integrated over the entire lens region. The FWHM is typically measured with operational wavelength rather than lens diameter. In other words, one can still possibly achieve a small FWHM focusing even in a large metalens. In the novel metalens, the size of FWHM is through the interplay between focusing and Fresnel region. Within the focused zone, FWHM is predominant by the phase gradient within the lens. A lens with 2π phase gradient is more capable of focusing with a narrower FWHM and a smaller beam spot. Conversely, within a diffractive Fresnel zone, the FWHM will decrease as the number of Fresnel zone increases (larger diameter or shortened focusing distance). The novel metalens can therefore exhibit light focusing featuring a small FWHM. The ultimate achievable FWHM is limited by the diffraction limit.

Figure 11:
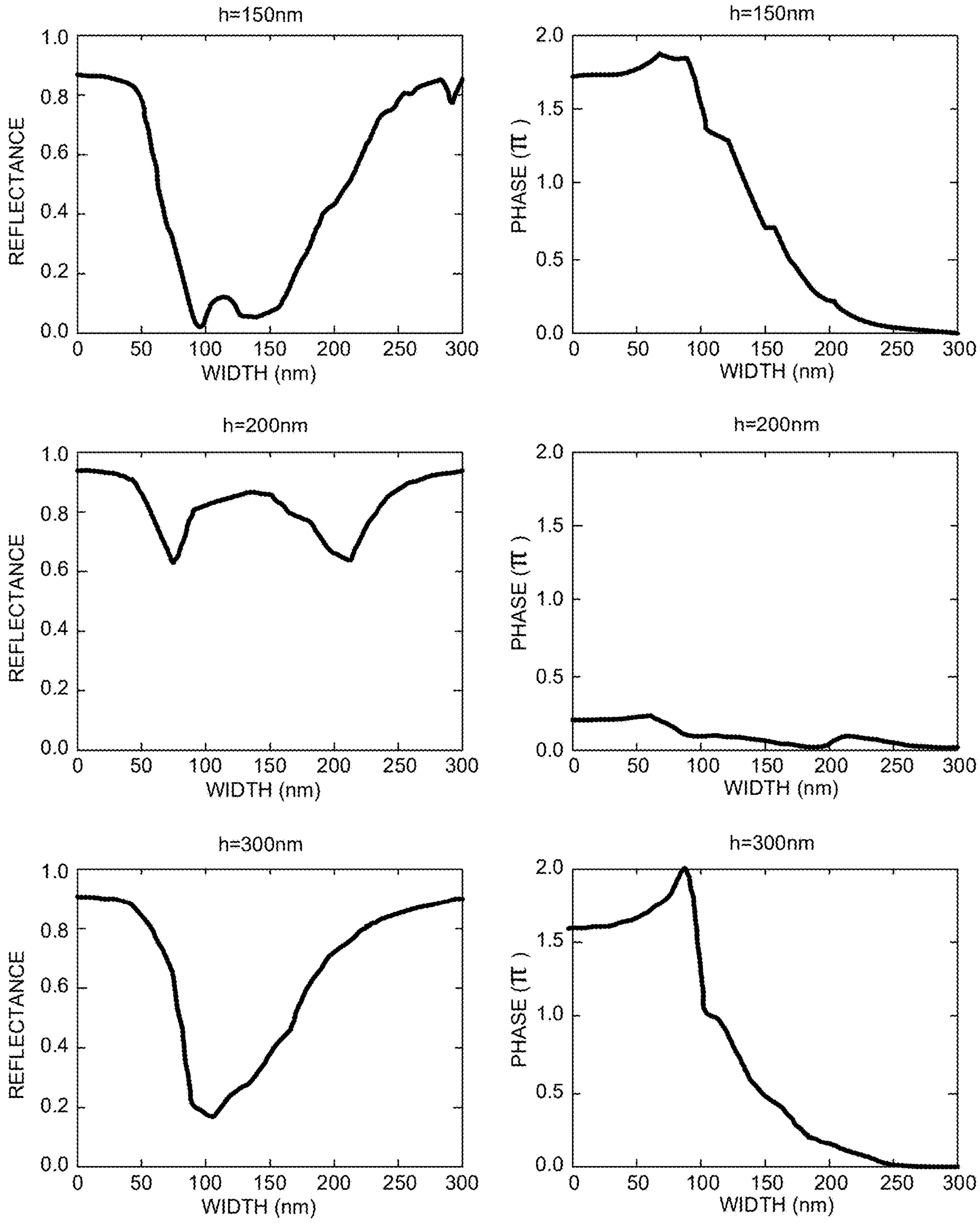
FIG. 11 shows the optical responses of underlying meta-atoms operated at $\lambda$=530 nm at three various heights ($h_m$) of the meta-atom.

FIG. 11 shows the optical responses of the underlying meta-atoms (FIG. 1 and FIG. 2) operated at λ=530 nm at three different heights ($h_m$) of the meta-atom. The meta-atom, the first layer 3 of dielectric material, and the second layer 6 of dielectric material can be composed of any suitable dielectric material such as a UV-curable resin having a refractive index of 1.52 (n=1.52). The phase shift can be maximally obtained when $h_m$=140 nm and 290 nm, while minimal when $h_m$=200 nm. Here, the phase coverage achieved is due to the plasmonic resonant effect, as the induced phase shift is accompanied by a change in amplitude response. Unlike dielectric meta-atoms, the maximal phase coverage is attained with no need to increase the height of the structures. The reflective plasmonic metalens employing the plasmonic effect therefore can be implemented with a much-reduced pillar thickness (hm=140 nm), enabling low aspect ratio design without compromising phase profile. This is an important differentiator when compared to transmissive dielectric metalenses used for beam collimation or intercoupling applications and makes the novel reflective metalens suitable for scalable roll-to-roll and roll-to-plate nanoimprinting methods.

Figure 12:
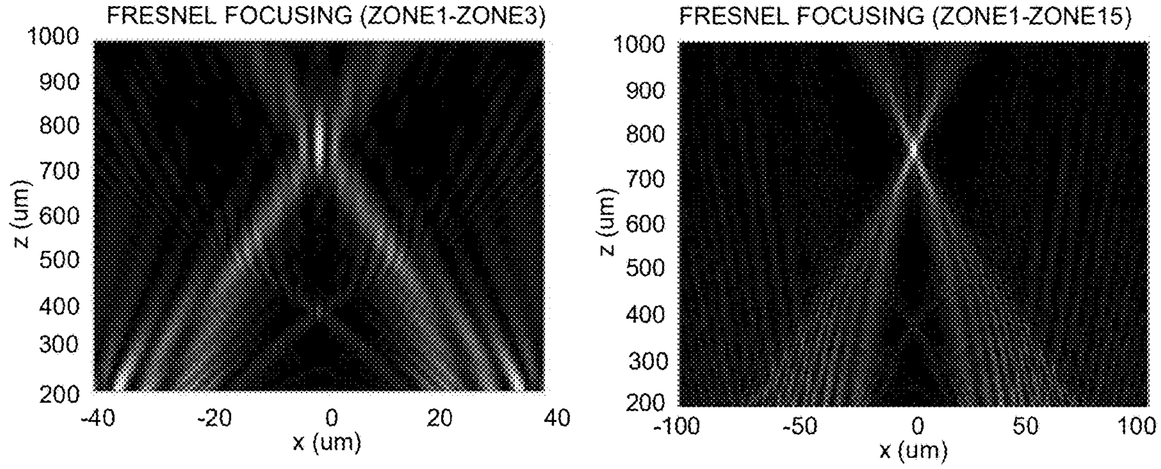
FIG. 12 illustrates the Fresnel focusing effect along the axial plane of a reflective metalens.

FIG. 12 illustrates the Fresnel focusing effect along the axial plane of a reflective metalens when the incoming light wave is impinging upon (left) three (Zone 1 to Zone 3) and fifteen (Zone 1 to Zone 15) Fresnel zones on either side of the metalens. It is seen that the focusing efficiency is enhanced by including more Fresnel regions, due to higher diffraction efficiency. The intensity profiles shown in FIG. 12 were generated using Finite Difference Time Domain (FDTD) simulations. The reflective metalens is composed of the disclosed meta-atoms, designed to focus plane wave at z=780 μm.

Figure 13:
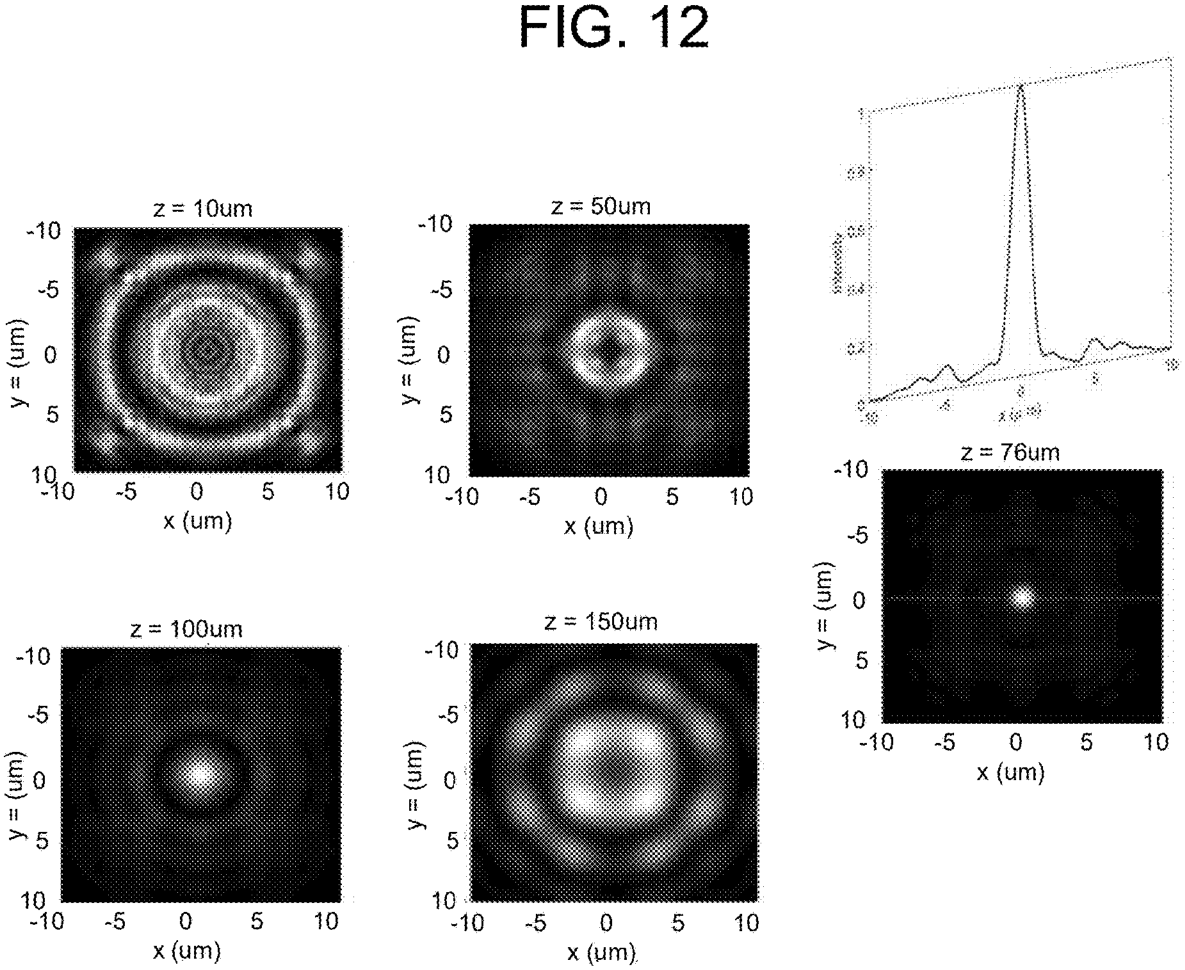
FIG. 13 illustrates cross-sectional intensity profiles of a reflective metalens at various propagation distances (along z-axis).

FIG. 13 illustrates cross-sectional intensity profiles (generated by FDTD simulation) of the novel reflective metalens at various propagation distances (along z-axis). The diameter of the reflective metalens is 20 μm which is designed to focus at z=75 μm (NA=0.2). In this example, the reflective metalens is mostly dominated by the focusing region due to relatively small NA. Also shown is the cross-sectional intensity distribution at the x-y focal plane (z=74 μm). The full width half maximum (FWHM) of the reflective metalens is 1.4 μm.

Figure 14:
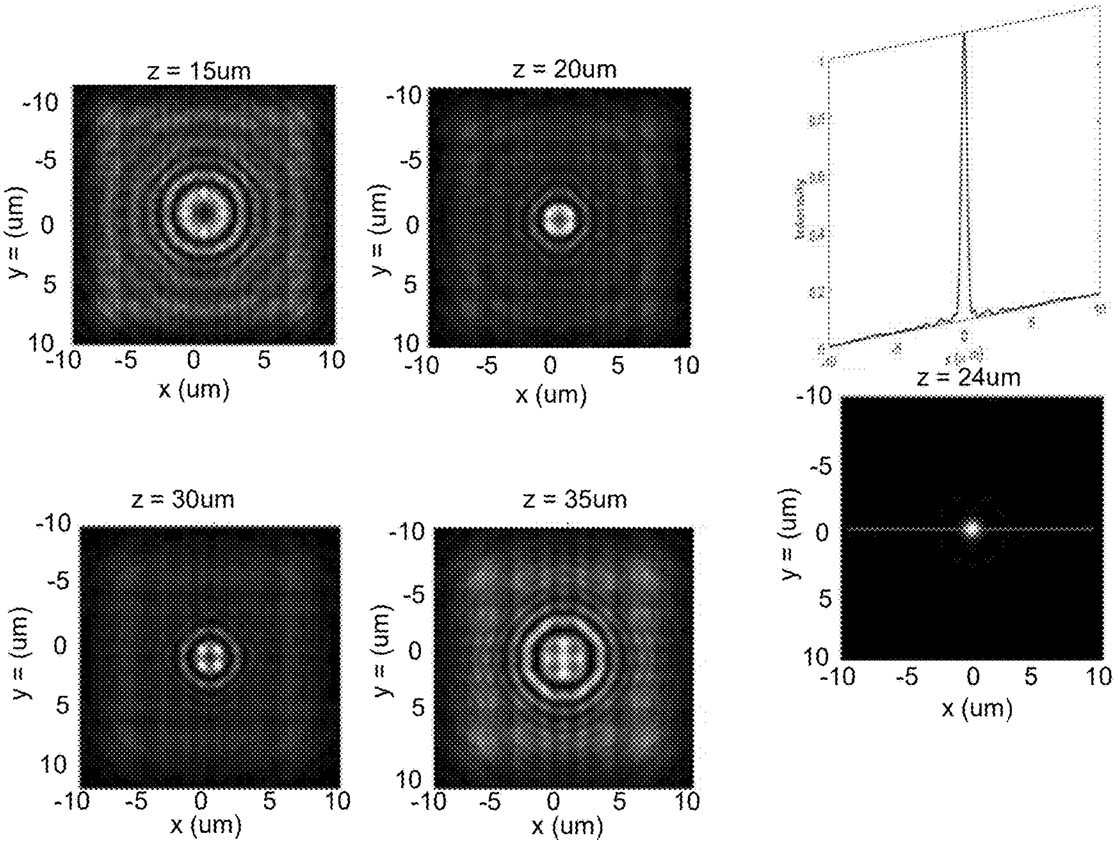
FIG. 14 illustrates intensity profiles of a reflective metalens at various propagation distances (along z-axis).

FIG. 14 illustrates intensity profiles (generated by FDTD simulation) of the reflective metalens at various propagation distances (along z-axis). The diameter of the lens is 20 μm which is designed to focus at a focal distance of z=25 μm (NA=0.6). In this example, Fresnel diffraction is predominant due to relatively high NA focusing. Also shown is the cross-sectional intensity distribution at the x-y focal plane (z=24 μm). The full width at half maximum (FWHM) of the metalens is 0.53 μm.

Figure 15:
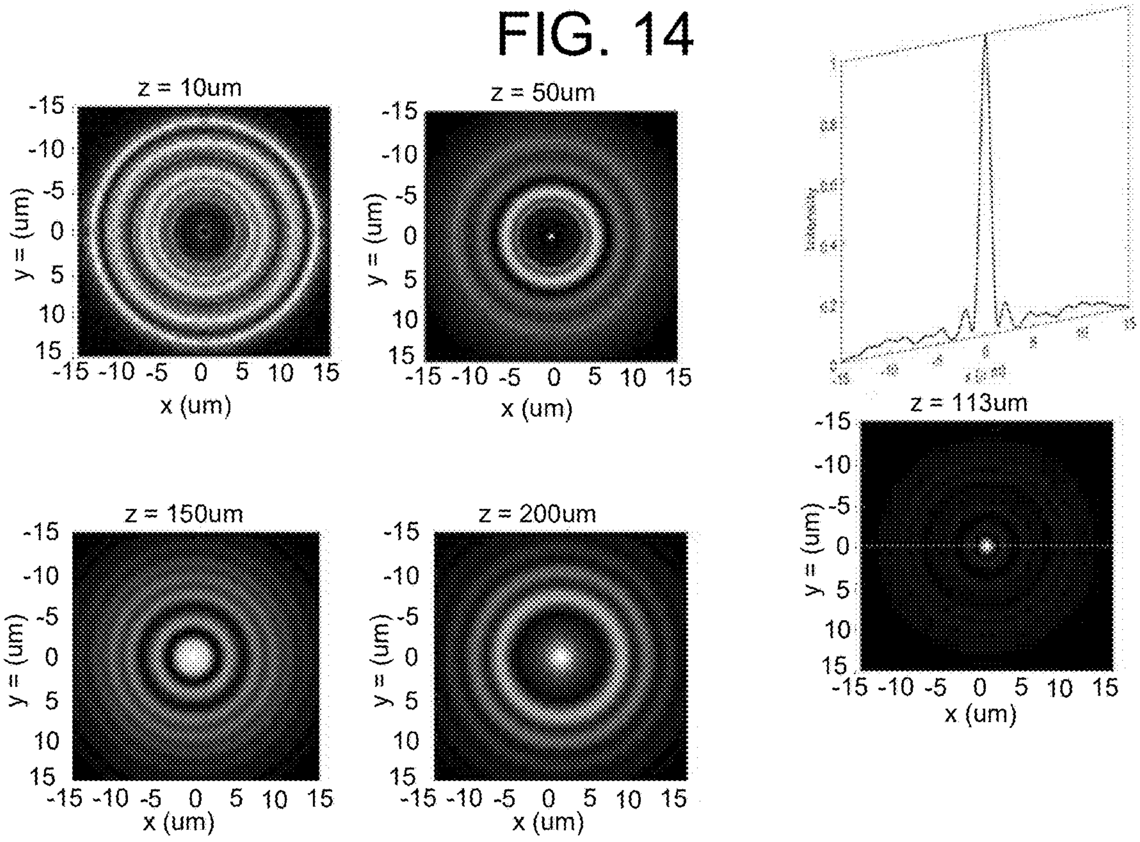
FIG. 15 illustrates intensity profiles of a reflective metalens at various propagation distances (along z-axis).

FIG. 15 illustrates intensity profiles (generated by FDTD simulation) of the reflective metalens at various propagation distances (along z-axis). The diameter of the FR is 30 μm which is designed to focus at a distance of z=113 μm (NA=0.2). Also shown is the cross-sectional intensity distribution at the x-y focal plane (z=113 μm). The full width at half maximum (FWHM) of the metalens is 1.2 μm.

Figures 16, 17, 18:
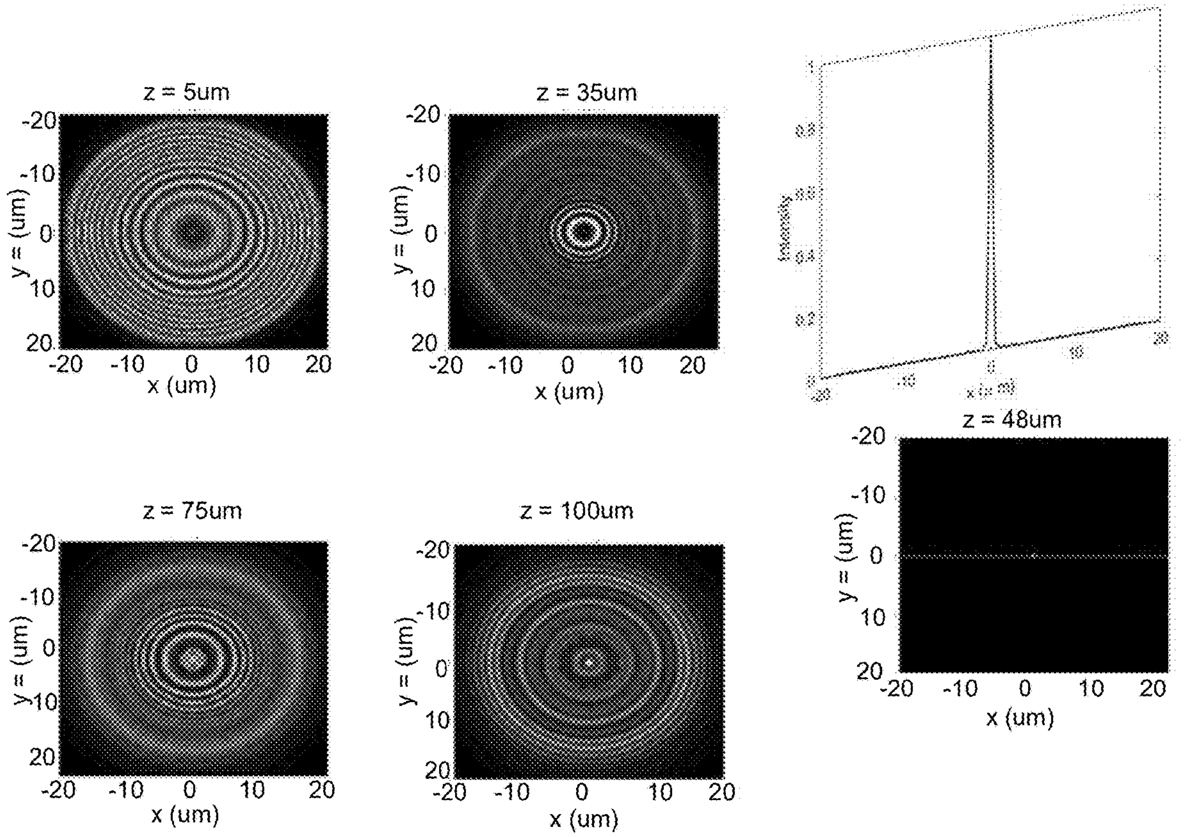
FIG. 16 illustrates intensity profiles of a reflective metalens at various propagation distances (along z-axis).
FIG. 17 is a first table that compares performance metrics of the circular reflective metalenses of FIGS. 13-16.
FIG. 18 a second table that compares performance metrics of the circular reflective metalenses of FIGS. 13-16.

FIG. 16 illustrates intensity profiles (generated by FDTD simulation) of the reflective metalens at various propagation distances (along z-axis). The diameter of the FR is 40 μm which is designed to focus at a distance of z=50 μm (NA=0.6). In this example, Fresnel diffraction is again predominant due to relatively high NA focusing. Also shown is the cross-sectional intensity distribution at the x-y focal plane (z=48 μm). The full width at half maximum (FWHM) of the metalens is 0.52 μm.

FIG. 17 is a table that compares performance metrics of the circular reflective metalenses of FIGS. 13-16 at an operational wavelength of λ0=530 nm. Focusing efficiency is defined by the ratio of 1) the intensity integrated within the FWHM region, to 2) the intensity integrated over the entire lens region. Transparent efficiency is the reflected power collected at the focal plane normalized to the incoming plane wave. Total efficiency is defined to be the multiplication of focusing efficiency and the transparent efficiency.

FIG. 18 is a table that compares performance metrics of the circular reflective metalenses of FIGS. 13-16 at an operational wavelength of λ0=530 nm. Focusing efficiency is defined by the ratio of: 1) the intensity integrated within the region of 3*FWHM (three times the FWHM region), to 2) the intensity integrated over the entire lens region. Transparent efficiency is the reflected power collected at the focal plane normalized to the incoming plane wave. Total efficiency is defined to be the multiplication of focusing efficiency and the transparent efficiency.

Figure 19A:
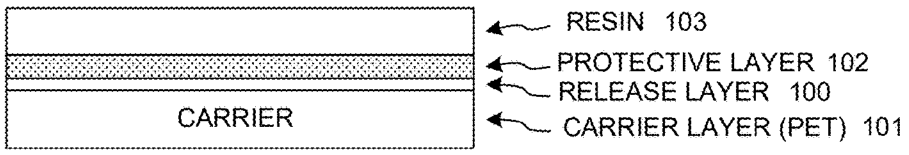
FIG. 19A illustrates a step in a method of making a metalens.
Figure 19B:
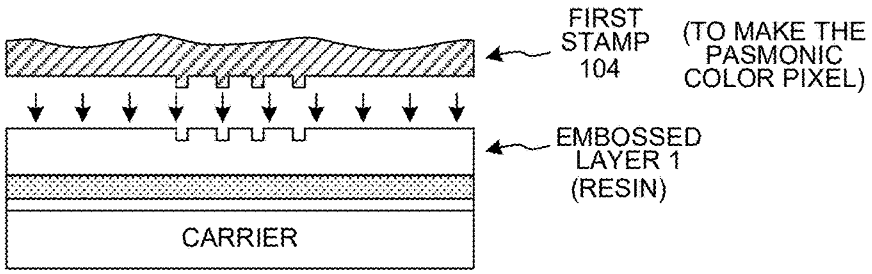
FIG. 19B illustrates a next step in the method of making the metalens.
Figure 19C:
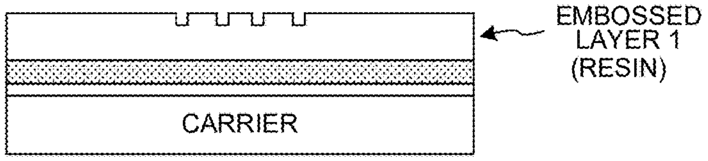
FIG. 19C illustrates a next step in the method of making the metalens.
Figure 19D:
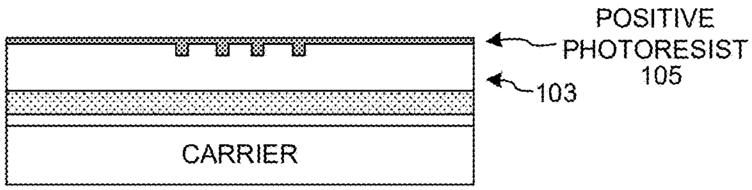
FIG. 19D illustrates a next step in the method of making the metalens.
Figure 19E:
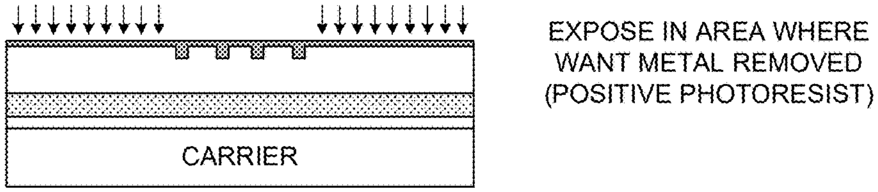
FIG. 19E illustrates a next step in the method of making the metalens.
Figure 19F:
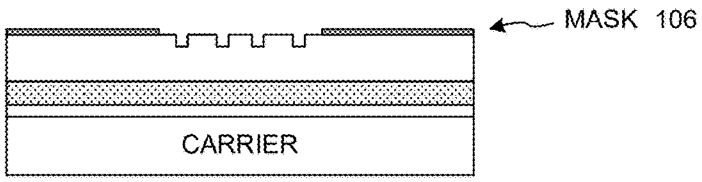
FIG. 19F illustrates a next step in the method of making the metalens.
Figure 19G:
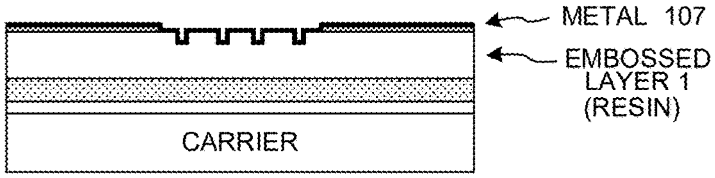
FIG. 19G illustrates a next step in the method of making the metalens.
Figures 19H, 19I, 19J, 19K, 19L, 19M:
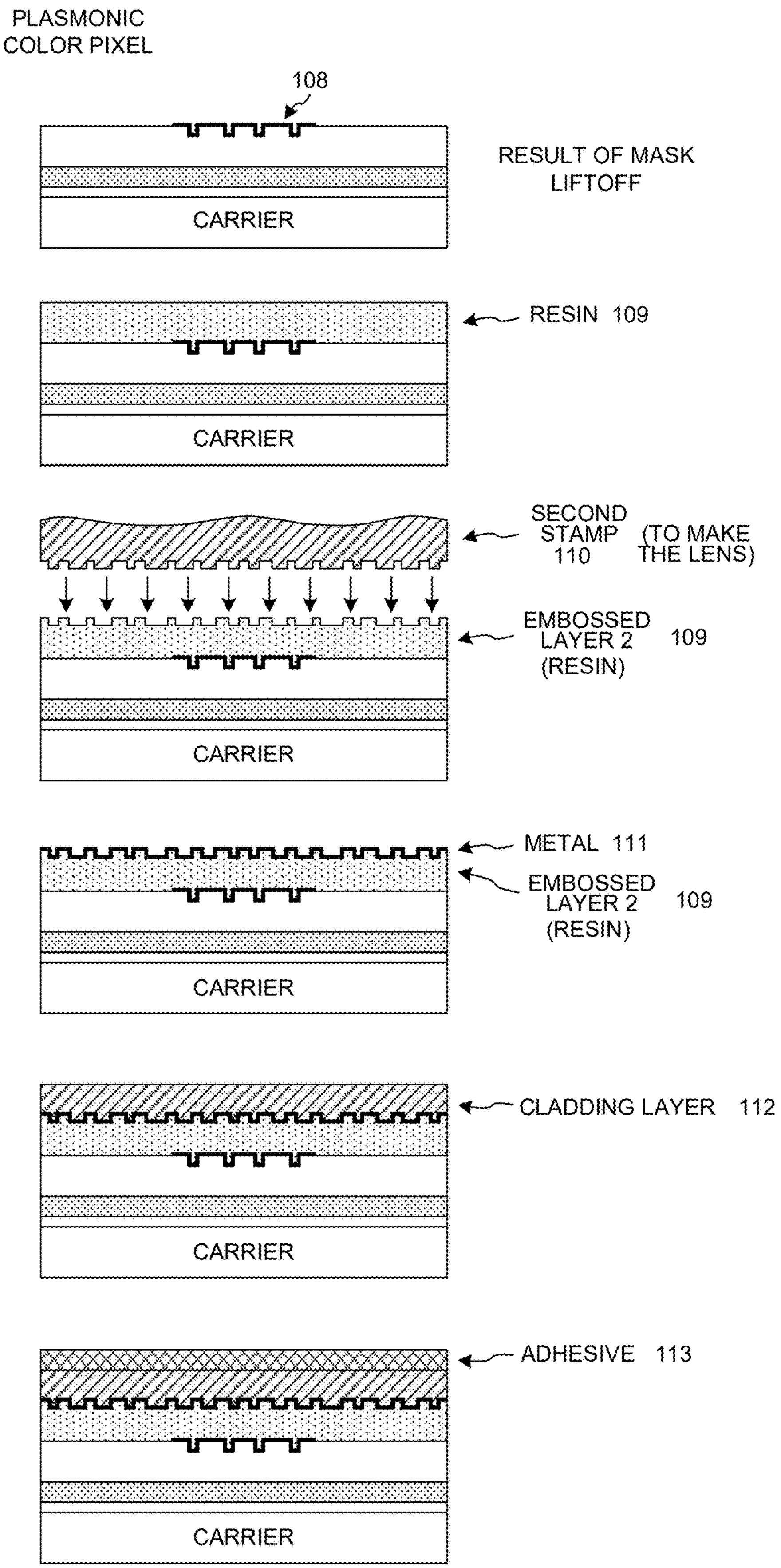
FIG. 19H illustrates a next step in the method of making the metalens.
FIG. 19I illustrates a next step in the method of making the metalens.
FIG. 19J illustrates a next step in the method of making the metalens.
FIG. 19K illustrates a next step in the method of making the metalens.
FIG. 19L illustrates a next step in the method of making the metalens.
FIG. 19M illustrates a next step in the method of making the metalens

FIG. 19A-19P together are a sequence of diagrams that illustrates a method of making a reflective metalens and reflective pixel object in accordance with an embodiment of the invention. A release layer 100 is deposited on a carrier layer 101. The carrier layer 101 may, for example, be a layer of polyethylene terephthalate (PET). A layer 102 of protective material is deposed on layer 100, and a layer 103 of UV-curable resin is deposited on the layer 102. FIG. 19A is a cross-sectional diagram showing the resulting stack of layers. Next, a first hard stamp 104 is pressed down into layer 103 to form indentations into the layer 103 as shown in FIG. 19B. The layer 103 is exposed to UV radiation to harden the layer. FIG. 19C illustrates the resulting structure. Next, a layer 105 of positive photoresist is applied over the embossed layer resin layer 103 as illustrated in FIG. 19D. The layer 105 is selectively exposed to UV radiation to expose areas in which metal is later to be removed in a lift-off operation. The selective exposure of photoresist layer 105 is illustrated in FIG. 19E. Next, areas of unexposed photoresist is removed. The result of this removal step is illustrated in FIG. 19F. The remaining exposed areas of photoresist form a mask 106. Next, a thin layer of metal 107 is deposited over the entire structure as illustrated in FIG. 19G. Next, the photoresist mask 106 is removed, and in the process any metal that was disposed on top of the photoresist mask is stripped off. Metal that was not disposed on the photoresist mask, however, remains. The resulting structure is shown in cross-section in FIG. 19H. The remaining metal is denoted by reference numeral 108. Next, a layer 109 of dielectric material is applied over the structure. This layer 109 dielectric material may be the same UV-curable resin what was used for layer 103. FIG. 19I shows the resulting structure in cross-section. Next, a second hard stamp 110 is pressed down into layer 109 to form indentations into the layer 109 as shown in FIG. 19J. For more information on a hard stamp such as second hard stamp 110 and how to make the hard stamp and how to use the hard stamp, and for other information about a reflective metalens, see: U.S. patent application Ser. No. 18/600,614, filed Mar. 8, 2024, by Ripon Dey, Milad Khoshnegar Shahrestani, and Graham Beales (the entire subject matter of which is hereby incorporated into this application by reference). Next, a thin layer 111 of metal is deposited over the entire structure to conformally coat the entire embossed surface of embossed layer 109. FIG. 19K shows the resulting structure in cross-section. Next, a layer 112 of dielectric material (sometimes called a cladding layer) is deposit on the structure of FIG. 19K so as to fill in the indentations, thereby to form what will be pillars of meta-atoms. The resulting structure is shown in cross-section in FIG. 19L. In one example, each of protective layer 102, embossed layer 103, embossed layer 109 and cladding layer 112 is a layer of the dielectric material Actega RAVG00338 RadKote Coating 801LV or 801HV available from Actega North America, Inc., 1450 Taylors Lane, Cinnaminson, New Jersey 08077, having a refractive index of 1.52. Next, a layer 113 of heat-activated adhesive is applied over the entire structure. The resulting structure 114 is illustrated in cross-section in FIG. 19M. The resulting structure 114 is a film of security features that may be sold as a product. The film may take the form of a roll of such flexible film. FIG. 19N shows how the film structure 114 of FIG. 19M can be inverted and attached, using the heat-activated adhesive layer 113, to a substrate 115. The substate 115 may, for example, be a bank note, a passport, a check, an admission ticket, an article of commerce that is the subject of black market counterfeit copying, a driver's license, an identification card. Next, the carrier layer 101 is removed by activating the release layer 100. This releasing is illustrated in FIG. 19O.

FIG. 19P illustrates the final security feature disposed on and adhered to the substate 115. Note that in this example, the sidewalls of all the meta-atoms pillars are coated with metal, as is the entire surface between adjacent meta-atom pillars, as are the end-faces of all the meta-atom pillars.

The pillars of the meta-atoms of the metalens are said to be "coated" with metal (in the static state of being coated) and this includes the situation in which the pillars of the meta-atoms are formed by depositing the cladding layer 112 over the metal layer 111 as shown in FIG. 19L. The term "coated" and "coating" are used regardless of the order that the metal layer of the meta-atoms and the dielectric material making up the pillar portions of the meta-atoms are deposited.

FIG. 20 is a diagram of a bank note 115 to which the security feature 116 has been attached. The exploded portion 117 illustrates, from a top-down perspective, an array of circular metalenses. Disposed above each circular metalens is a corresponding reflective pixel object. Not only is the metalens comprised of a plurality of plasmonic meta-atoms, but also the reflective pixel object is comprised of a plurality of plasmonic meta-atoms. The meta-atoms of the reflective pixel object illustrated in FIG. 19P face downward toward the upward facing reflective metalens.

Figure 21:
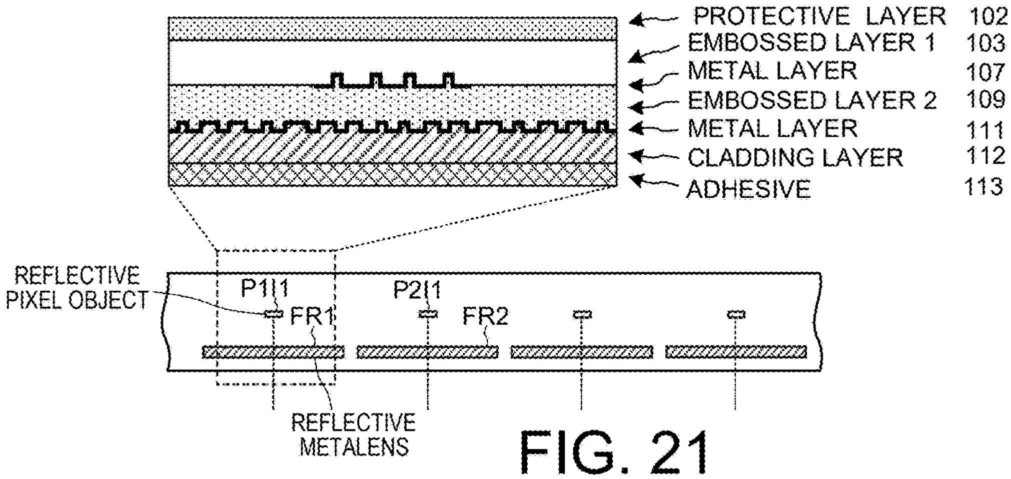
FIG. 21 is a diagram that depicts a portion of the film made in the method of FIGS. 19A-19P.

FIG. 21 is a diagram that depicts a portion of the film 114 involving multiple reflective metalenses, with each reflective metalens having an associated reflective pixel object disposed above it. The reference numeral P1I1 denotes a first reflective pixel object P1 of a first image I1. The reference number P2I1 denotes a second reflective pixel object P2 of the first image I1. The reference numeral FR1 denotes the first focusing reflector (plasmonic metalens) whereas the reference numeral FR2 denotes the second focusing reflector (plasmonic metalens). The metalenses are not a fully transmissive metalenses, but rather are reflective metalenses in that, in this example, the tops of all the meta-atom pillar structures are covered in metal, as are the entire surface areas extending between adjacent meta-atom pillar structures, as are the sidewalls of the meta-atom pillar structures. In metalens operation and use, no light passes from the direction of the cladding layer, up and through the plane of metal layer 111, but rather incident light approaching the metalens from above the metalens structure (in the perspective illustrated in FIG. 21) is incident on the metalens structure and is reflected back upward with substantially no light passing through metal layer 111.

Figure 22:
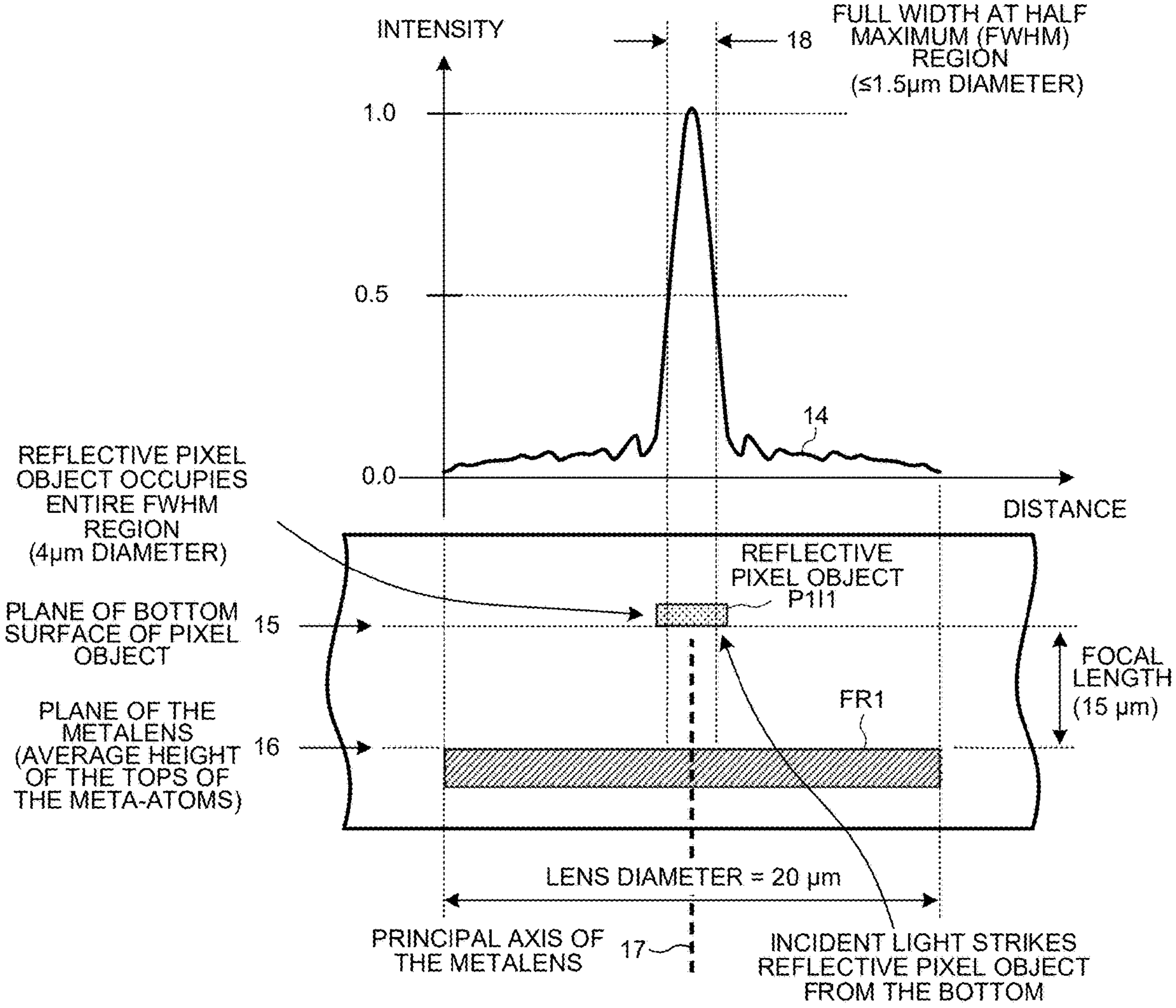
FIG. 22 is a diagram that illustrates the FWHM region of the metalens FR1 made in the method of FIGS. 19A-19P.

FIG. 22 is a diagram that illustrates the FWHM region 18 of the metalens FR1 of FIG. 21. Line 14 represents the normalized intensity of reflected light in the plane 15 located at the focal distance from the plane 16 of the metalens, for a case in which light of uniform intensity normal to the plane 16 of the metalens is incident down on the overall structure from above. The plane 16 of the metalens here means the plane located at the average of the tops (the metalized end-faces of the pillars) of the meta-atoms of the lens. The FWHM region is less than 1.5 microns in diameter. The principal axis of the lens is indicated by reference numeral 17. The reflective pixel object P1I1 is disposed over the reflective metalens structure FR1 extending in the second plane 15 so that the principal axis 17 passes through the reflective pixel object P1I1, and such that the reflective pixel object P1I1 covers the entire FWHM region 18. In the illustrated example, the reflective pixel object is four microns in diameter.

Figure 23:
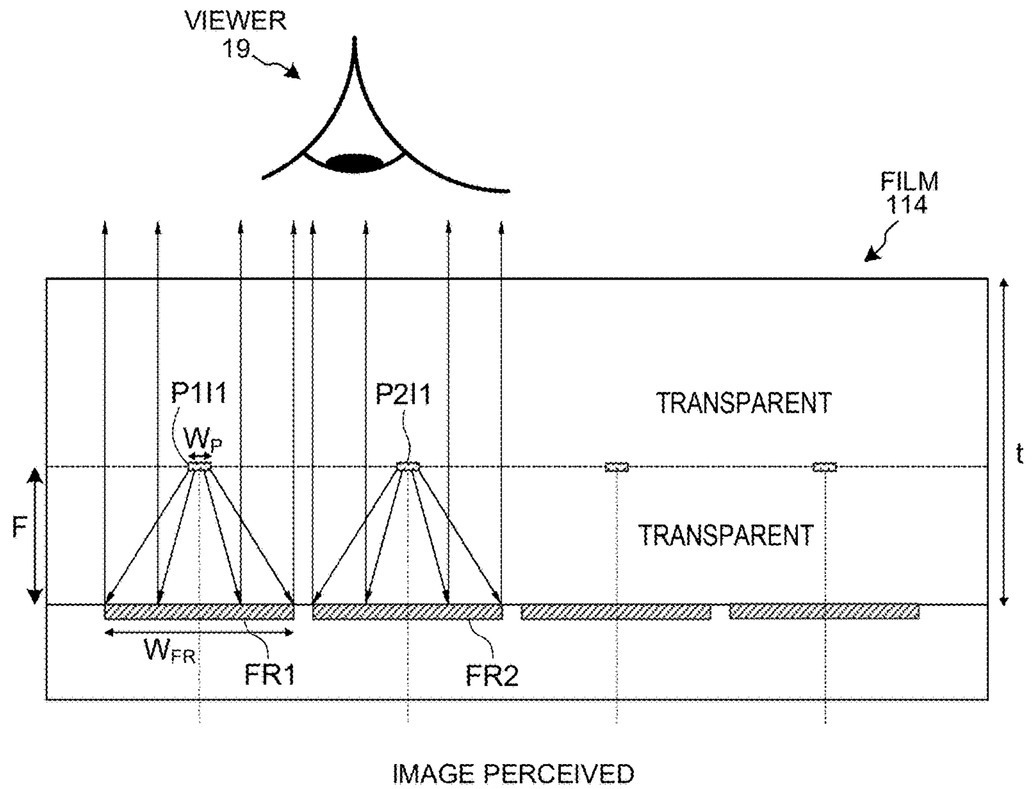
FIG. 23 is a simplified cross-sectional diagram of the film made in the method of FIGS. 19A-19P in a situation in which a viewer is viewing the film at a viewing angle that is normal to the plane of the metalenses of the film.

FIG. 23 is a simplified cross-sectional diagram of the film 114 of FIG. 21 in a situation in which a human viewer 19 is viewing the film structure 114 at a viewing angle that is normal to the plane 16 of the metalenses of the film. Due to the focusing effect of the metalenses, the film magnifies each reflective pixel object of the image I1 such that the viewer 19 perceives the image I1 of pixels.

Figure 24:
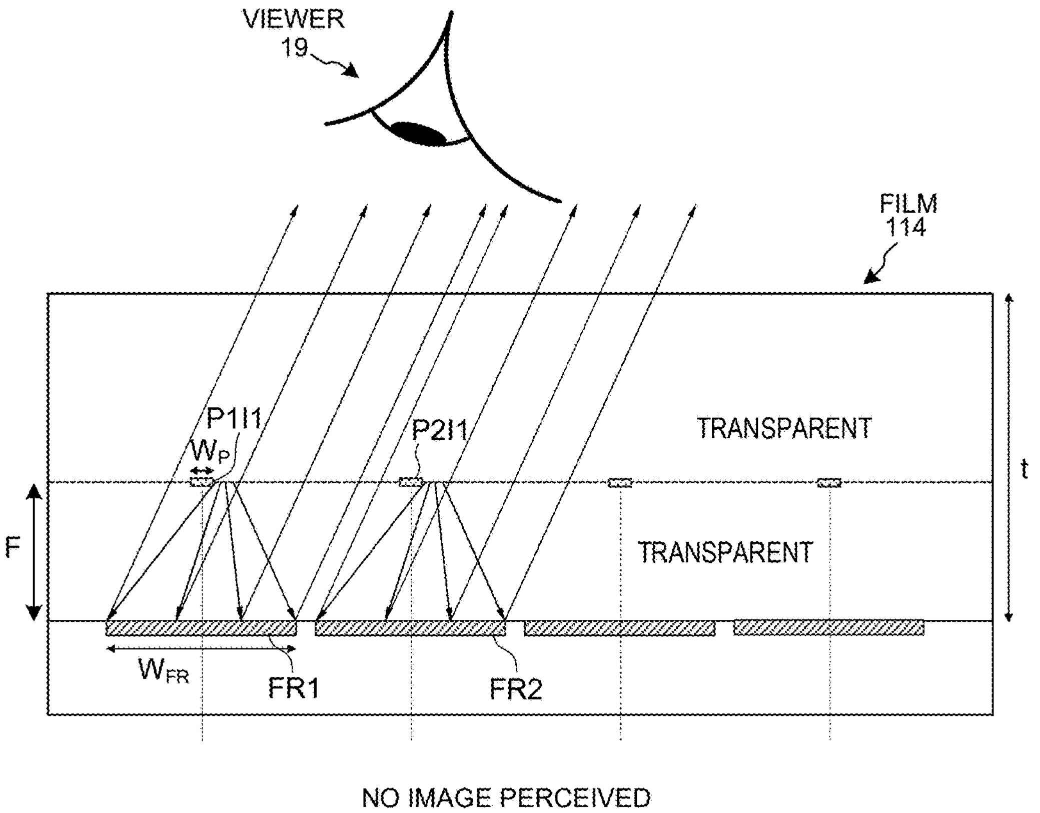
FIG. 24 is a simplified cross-sectional diagram of the same film as shown in FIG. 23, but in a situation in which the viewer is viewing the film at a viewing angle that is substantially tilted.

FIG. 24 is a simplified cross-sectional diagram of the same film 114 of FIG. 21, but in a situation in which the viewer 19 is viewing the film structure at a viewing angle that is substantially tilted. The viewing angle is not normal to the plane 16 of the metalenses of the film. The metalenses do not focus on the reflective pixel objects, and consequently the viewer 19 does not perceive the image I1 of pixels. Without focusing on the reflective pixel objects and without the magnification function of the metalenses, the reflective pixel objects P1I1 and P2I1 are too small to be seen by the human eye.

Figure 25:
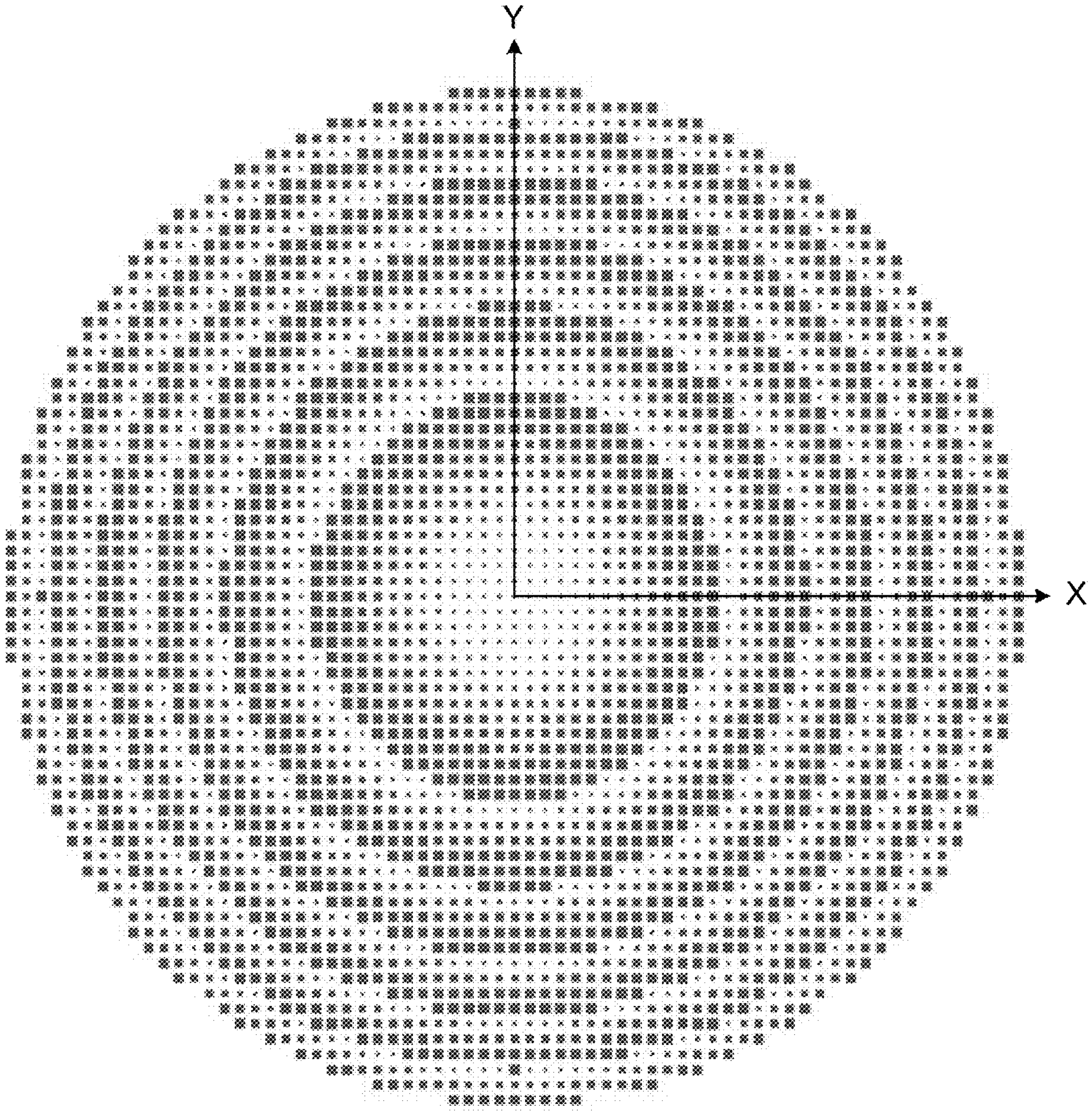
FIG. 25 is a top-down perspective diagram that illustrates one embodiment of the metalens FR1 made in the method of FIGS. 19A-19P.

FIG. 25 is a top-down perspective diagram that illustrates one embodiment of the metalens FR1. The metalens FR1 of FIG. 25 is ultrathin in that the tops of all the meta-atom pillar structures are in substantially the same plane, and the heights $h_m$ of all the meta-atom pillars is the same at less than 500 nm. The metalens FR1 of FIG. 25 has a focal length of 15 microns. The metalens FR1 of FIG. 25 does not have "facets" with nanostructures disposed on the facets, but rather the lens is ultrathin and there are no such facets in that the nanopillars are extend from a common plane.

FIG. 26A and FIG. 26B together are a table that shows the width $d_m$ of each of the meta-atoms (width in nanometers) in a quarter of the upper right quadrant of the metalens of FIG. 25. The layout of the meta-atoms of the metalens is symmetrical, so description of the meta-atoms of one quadrant is sufficient to describe the meta-atoms of the entire metalens. In FIG. 26A, the number in the leftmost column indicates the distance (in microns) from the center of the lens to a meta-atom of interest. In FIG. 26A, the number in the upper row indicates the distance (in microns) from the center of the lens to a meta-atom of interest. The end-faces of all the pillar are squares, so the indicated width $d_m$ dimension describes the size of the square. Whereas the table of FIG. 26A lists the meta-atom sizes for x dimension offsets from 0.3 microns to 4.8 microns, the table of FIG. 26B lists the meta-atom sizes for x dimension offsets from 5.1 microns to 9.9 microns.

Figures 27, 28:
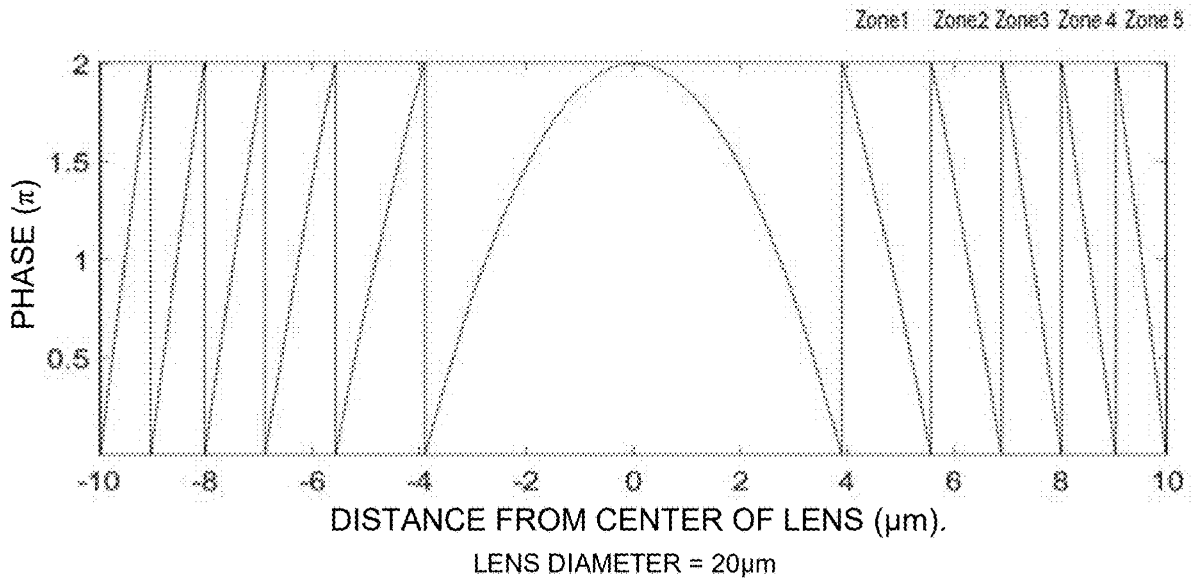
FIG. 27 is a diagram illustrating the phase profile of the metalens of FIG. 25.
FIG. 28 is a table that lists the width of the Fresnel zones of the metalens of FIG. 25.

FIG. 27 is a diagram illustrating the phase profile of the metalens of FIG. 25. The metalens has five Fresnel zones.

FIG. 28 is a table that lists the width of each Fresnel zone, along with its corresponding steering angle.

Figure 29:
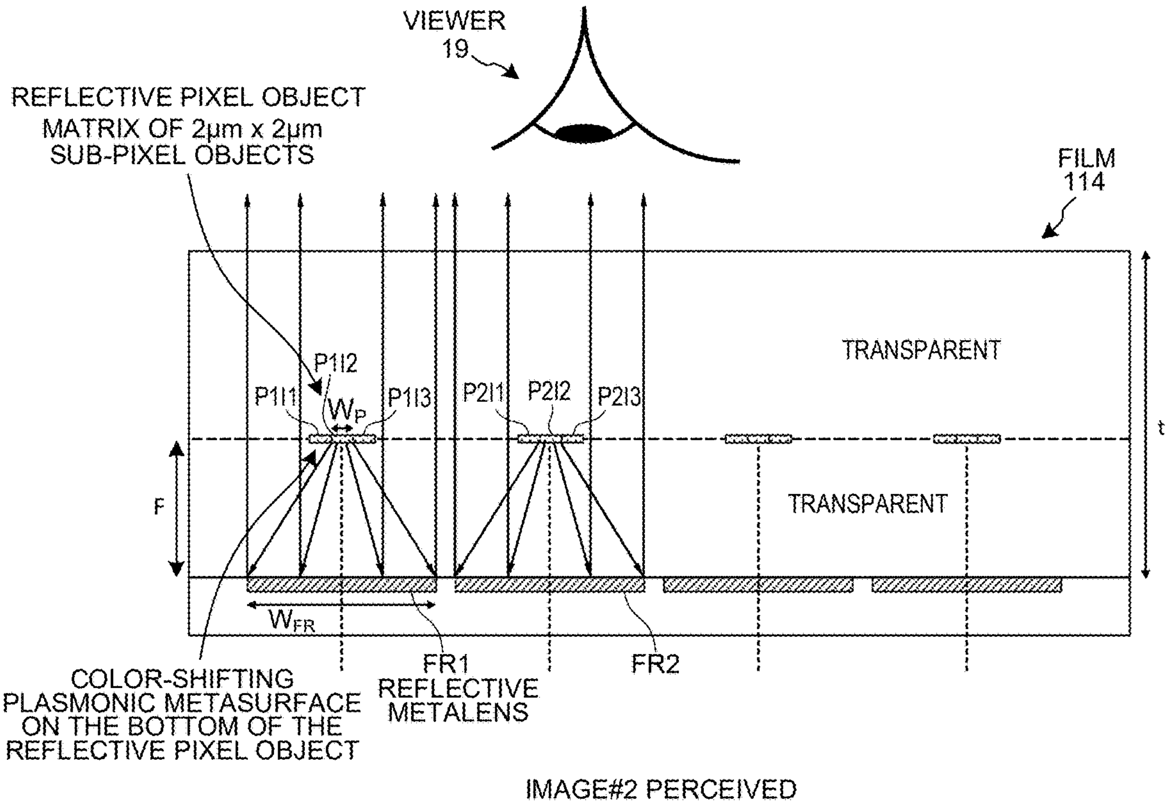
FIG. 29 is a simplified cross-sectional diagram of another embodiment of the film made in the method of FIGS. 19A-19P (the reflective pixel objects include multiple color-shifting sub-pixel portions) in a situation in which the viewer is viewing the film at a viewing angle that is normal to the plane of the metalenses of the film.

FIG. 29 is a simplified cross-sectional diagram of another embodiment of the film 114 of FIG. 21 in a situation in which the viewer 19 is viewing the film structure 114 at a viewing angle that is normal to the plane 16 of the metalenses of the film. In this embodiment, the reflective pixel object above the metalens FR1 actually comprises a plurality sub-pixel portions. The reflective pixel object comprises color-shifting sub-pixel portions P1I1, P1I2 and P1I3. The reflective pixel object above the second metalens FR2 comprises color-shifting sub-pixel portions P2I1, P2I2 and P2I3. When the viewer 19 is viewing the film structure at the viewing angle that is normal to the plane 16 of the metalenses, the viewer 19 perceives the second image I2 because each metalens is focused on the central sub-pixel of its respective reflective pixel object. The plasmonic metasurfaces of the color-shifting sub-pixel portions (the meta-atoms of the color-shifting sub-pixel portions) are facing toward the substrate. The second "image" I2 is the combination of light from all the metals/reflective pixel object pairs that the viewer 19 sees together as an image.

Figure 30:
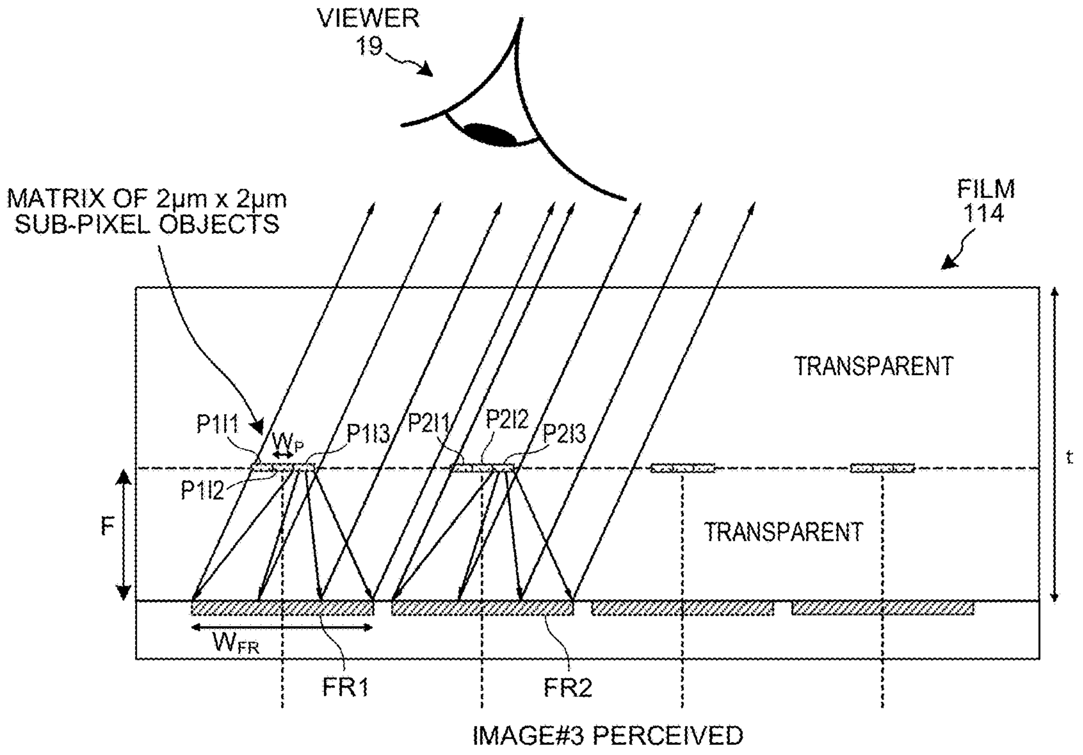
FIG. 30 is a simplified cross-sectional diagram of the same film as shown in FIG. 29, but in a situation in which the viewer is viewing the film at a viewing angle that is substantially tilted.

FIG. 30 is a simplified cross-sectional diagram of the same film 114 of FIG. 29, but in a situation in which the viewer 19 is viewing the film structure at a viewing angle that is tilted. The viewing angle is not normal to the plane 16 of the metalenses of the film. When the viewer 19 is viewing the film structure at this viewing angle, the viewer perceives the third image 13 because each metalens is focused on the rightmost sub-pixel of its respective reflective pixel object. Accordingly, depending on tilt angle, the viewer perceives one of a plurality of images, or alternatively if the viewing angle is appropriate then the viewer 19 perceives no image at all if the metalenses are not focused on any part of their respective reflective pixel objects.

Although certain specific embodiments are described above for instructional purposes, the teachings of this patent document have general applicability and are not limited to the specific embodiments described above. The novel structure of the ultrathin reflective metalens is not limited to use with an associated reflective pixel object, and is not limited to use as a security feature. It can be formed on, or attached to, either a flexible substrate or a hard rigid substrate. Accordingly, various modifications, adaptations, and combinations of various features of the described embodiments can be practiced without departing from the scope of the invention as set forth in the claims.

What is claimed is:

1. A method comprising:

forming a plasmonic metalens structure, wherein the plasmonic metalens structure comprises a plurality of meta-atoms disposed in a plurality of concentric Fresnel zones, wherein each meta-atom comprises a pillar of dielectric material that extends from a first layer of the dielectric material and has a maximum width and a maximum height of less than 500 nanometers, wherein the plasmonic metalens structure has a principal axis, and wherein the plasmonic metalens structure extends substantially in a first plane; and forming a reflective pixel object disposed on a second dielectric layer located between the plasmonic metalens structure and the reflective pixel object such that the principal axis passes through the reflective pixel object, wherein the reflective pixel object extends substantially in a second plane parallel to the first plane, and wherein the first plane is separated from the second plane by less than one hundred microns;

wherein the plasmonic metalens structure and the reflective pixel object are parts of a flexible film;

wherein forming a reflective pixel object comprises:

providing a base having a carrier layer, a release layer disposed on the carrier layer, and a protective layer disposed on the release layer;

embossing a first pattern of indentations into a first layer of UV-curable resin disposed on the protective layer and curing the first layer of UV-curable resin, wherein the first pattern defines a plurality of meta-atom indentations of the reflective pixel object; and selectively depositing a first metal layer onto the plurality of meta-atom indentations of the reflective pixel object, thereby forming a plurality of meta-atoms of the reflective pixel object; and wherein forming a plasmonic metalens structure comprises:

depositing a second layer of UV-curable resin over the embossed first layer of UV-curable resin;

embossing a second pattern of indentations into the second layer of UV-curable resin and curing the second layer of UV-curable resin, wherein the second pattern defines a plurality of meta-atom indentations of the plasmonic metalens structure; and depositing a second metal layer onto the plurality of meta-atom indentations of the plasmonic metalens structure and depositing a cladding layer over the embossed second layer, thereby forming the plurality of meta-atoms of the plasmonic metalens structure; and depositing an adhesive layer over the cladding layer.

2. The method of claim 1, wherein the plasmonic metalens structure extends over a first area A1 in the first plane, wherein the reflective pixel object extends over a second area A2 in the second plane, and wherein A2 is less than ten percent of A1.

3. The method of claim 1, wherein the reflective pixel object comprises the plurality of meta-atoms.

4. The method of claim 1, wherein the plurality of meta-atoms of the reflective pixel object are disposed to face the plasmonic metalens structure.

5. The method of claim 1, wherein reflective pixel object comprises a first sub-pixel portion and a second sub-pixel portion, wherein the first sub-pixel portion comprises a first plurality of meta-atoms, wherein the second sub-pixel portion comprises a second plurality of meta-atoms, wherein the first plurality of meta-atoms of the first sub-pixel are configured to suppress a larger portion of wavelengths of the visible spectrum of light than the second plurality of meta-atoms of the second sub-pixel, such that the first sub-pixel portion and the second sub-pixel portion appear to a viewer to have different colors.

6. The method of claim 1, wherein the second layer of dielectric material comprises no polyethylene terephthalate (PET).

7. The method of claim 1, wherein the pillar of each meta-atom has a sidewall, and wherein all sidewalls of all meta-atoms of the plasmonic metalens structure are coated with metal.

8. The method of claim 1, wherein the pillar of each meta-atom has a sidewall, and wherein no sidewall of any of the meta-atoms of the plasmonic metalens structure is coated with metal.

9. The method of claim 1, wherein the pillar of each meta-atom has a sidewall, wherein a surface of the first layer of the dielectric material facing the reflective pixel object is completely conformally coated with metal such that all surfaces of the first layer of the dielectric material extending between meta-atom pillars are coated with metal, and such that all sidewalls of all the pillars of all the meta-atoms are coated with metal, and such that all the end-faces of all the pillars of all the meta-atoms are coated with metal.

10. The method of claim 1, wherein the adhesive layer comprises a heat-activated adhesive.

11. The method of claim 1, wherein the reflective pixel object has a plasmonic metasurface, and wherein the plasmonic metasurface faces the plasmonic metalens structure.

12. The method of claim 1, further comprising attaching the adhesive layer to a substrate and removing the carrier layer by activating the release layer.

13. The method of claim 12, wherein:

the substrate comprises a bank note, a passport, a check, an admission ticket, a driver's license, an identification card, or an article of commerce that is subject to counterfeit copying.

14. The method of claim 1, wherein the meta-atoms are configured with a low aspect ratio having a height/width less than 2.

15. The method of claim 1, wherein the flexible film is configured to present a first image to a human viewer viewing the flexible film at a first viewing angle that is substantially normal to the first plane, and wherein the flexible film is configured to present no image or a second, different image to the human viewer viewing the flexible film at a second viewing angle that is substantially tilted relative to the first plane.

* * * * *